(12) United States Patent
Haberbusch et al.

(10) Patent No.: US 10,981,666 B1
(45) Date of Patent: Apr. 20, 2021

(54) SYSTEM AND METHOD FOR THE TRANSFER OF CRYOGENIC FLUIDS

(71) Applicant: Neoex Systems, Inc., Amherst, OH (US)

(72) Inventors: Mark Steven Haberbusch, Amherst, OH (US); Philip Travis Putman, Huron, OH (US)

(73) Assignee: Neoex Systems, Inc., Amherst, OH (US)

( * ) Notice: Subject to any disclaimer, the term of this patent is extended or adjusted under 35 U.S.C. 154(b) by 0 days.

(21) Appl. No.: 16/987,602

(22) Filed: Aug. 7, 2020

Related U.S. Application Data

(62) Division of application No. 15/606,201, filed on May 26, 2017, now Pat. No. 10,773,822.

(60) Provisional application No. 62/343,003, filed on May 29, 2016.

(51) Int. Cl.
| | |
|---|---|
| B64D 39/00 | (2006.01) |
| F17C 5/02 | (2006.01) |
| B64D 39/06 | (2006.01) |
| F17C 5/00 | (2006.01) |
| B64D 37/14 | (2006.01) |
| B64F 1/28 | (2006.01) |
| B64C 39/02 | (2006.01) |

(Continued)

(52) U.S. Cl.
CPC ............... *B64D 39/06* (2013.01); *B60S 5/02* (2013.01); *B64C 39/024* (2013.01); *B64D 37/14* (2013.01); *B64F 1/28* (2013.01); *F17C 5/007* (2013.01); *F17C 5/02* (2013.01); *B64C 2201/063* (2013.01); *B64C 2201/16* (2013.01); *B64D 2041/005* (2013.01); *F17C 2205/037* (2013.01); *F17C 2205/0355* (2013.01); *F17C 2221/012* (2013.01); *F17C 2223/0161* (2013.01); *F17C 2225/0161* (2013.01); *F17C 2225/033* (2013.01); *F17C 2265/065* (2013.01)

(58) Field of Classification Search
CPC .... F17C 13/081; F17C 13/004; F17C 13/126; B67D 7/04; B67D 7/0401; B67D 7/845; B67D 37/16; B67D 37/30; B67D 2007/043; B67D 2007/0423; B67D 2007/0403; B64C 2201/027; B64C 2201/063; B64F 1/28; B60S 5/02; B64D 39/06
See application file for complete search history.

(56) References Cited

U.S. PATENT DOCUMENTS

| | | | | |
|---|---|---|---|---|
| 1,869,487 | A * | 8/1932 | Lefevre ................. | B64D 39/00 244/135 A |
| 3,603,480 | A * | 9/1971 | Irie .......................... | B67D 7/38 222/20 |
| 3,946,572 | A | 3/1976 | Bragg | |

(Continued)

FOREIGN PATENT DOCUMENTS

WO    2007/059781    5/2007

*Primary Examiner* — Timothy L Maust
(74) *Attorney, Agent, or Firm* — Renner, Otto, Boisselle & Sklar, LLP

(57) ABSTRACT

A system and method for the transfer of cryogenic fluid fuel includes a nozzle positionable with respect to fuel tank inlet, e.g., of an unmanned aerial vehicle (UAV), a seal to seal the area where the nozzle and inlet are connected, a collapsible and expandable bellows providing an isolation volume where the fluid is transferred from the nozzle into the inlet; a vacuum is provided in the volume to avoid accumulation of fuel or other species in the volume.

10 Claims, 23 Drawing Sheets

(51) Int. Cl.
  *B60S 5/02* (2006.01)
  *B64D 41/00* (2006.01)

(56) References Cited

U.S. PATENT DOCUMENTS

| | | | | |
|---|---|---|---|---|
| H297 H | * | 7/1987 | Schultz | B64F 1/28 |
| | | | | 137/234.6 |
| 4,986,446 A | * | 1/1991 | Montgomery | B60S 5/02 |
| | | | | 137/234.6 |
| 5,269,468 A | | 12/1993 | Adiutori | |
| 5,301,723 A | * | 4/1994 | Goode | F17C 5/02 |
| | | | | 141/11 |
| 5,353,849 A | * | 10/1994 | Sutton | F17C 5/007 |
| | | | | 141/18 |
| 5,404,923 A | * | 4/1995 | Yamamoto | B64G 5/00 |
| | | | | 137/355.2 |
| 5,505,237 A | * | 4/1996 | Magne | B64F 1/28 |
| | | | | 137/342 |
| 5,548,962 A | | 8/1996 | Luger et al. | |
| 5,589,020 A | * | 12/1996 | Varghese | F16L 59/14 |
| | | | | 156/185 |
| 5,771,946 A | * | 6/1998 | Kooy | F17C 6/00 |
| | | | | 141/82 |
| 5,971,040 A | | 10/1999 | McFarland et al. | |
| 6,024,074 A | * | 2/2000 | Koethe | F02M 31/20 |
| | | | | 123/541 |
| 6,237,647 B1 | * | 5/2001 | Pong | B67D 7/0401 |
| | | | | 141/231 |
| 6,269,848 B1 | | 8/2001 | Corfitsen | |
| 6,382,269 B1 | | 5/2002 | Tatsuno | |
| 6,513,837 B2 | | 2/2003 | Fujikawa et al. | |
| 6,923,008 B2 | | 8/2005 | Brook et al. | |
| 7,028,724 B2 | * | 4/2006 | Cohen | F02M 21/0221 |
| | | | | 141/94 |
| 7,082,969 B1 | * | 8/2006 | Hollerback | B67D 7/04 |
| | | | | 141/38 |
| 7,093,626 B2 | * | 8/2006 | Li | F17C 11/005 |
| | | | | 141/231 |
| 7,296,601 B2 | * | 11/2007 | Webb | B60S 5/02 |
| | | | | 141/311 A |
| 7,316,242 B2 | * | 1/2008 | Porter | F17C 13/025 |
| | | | | 137/255 |
| 3,056,860 A1 | | 11/2011 | Small et al. | |
| 8,164,302 B2 | * | 4/2012 | Capizzo | B60K 15/063 |
| | | | | 320/109 |
| 8,393,362 B1 | * | 3/2013 | Hollerback | B25J 11/00 |
| | | | | 141/94 |
| 8,667,690 B2 | * | 3/2014 | Cajiga | B60S 5/02 |
| | | | | 29/897.3 |
| 8,939,396 B2 | | 1/2015 | Geneste | |
| 8,991,444 B2 | * | 3/2015 | Boutet | B64G 5/00 |
| | | | | 141/59 |
| 9,181,078 B2 | * | 11/2015 | Cajiga | B60S 5/02 |
| 10,029,803 B1 | * | 7/2018 | Larsen | B64F 3/02 |
| 10,429,857 B2 | * | 10/2019 | Weaver | G05D 1/104 |
| 2001/0054818 A1 | * | 12/2001 | Fujikawa | F16L 29/007 |
| | | | | 285/18 |
| 2004/0055642 A1 | * | 3/2004 | Valentian | F02K 9/343 |
| | | | | 137/341 |
| 2010/0019090 A1 | | 1/2010 | Mouskis et al. | |
| 2015/0123462 A1 | * | 5/2015 | Kamradt | B67D 7/78 |
| | | | | 307/9.1 |
| 2017/0050749 A1 | * | 2/2017 | Pilskalns | B64F 1/007 |
| 2017/0341769 A1 | | 11/2017 | Haberbusch et al. | |
| 2018/0196418 A1 | * | 7/2018 | Meier | B64C 39/024 |
| 2018/0229852 A1 | * | 8/2018 | Boss | B64C 39/024 |
| 2018/0312390 A1 | * | 11/2018 | Homann | B67D 7/78 |
| 2019/0077521 A1 | * | 3/2019 | Kelly | B64F 1/28 |
| 2020/0180940 A1 | * | 6/2020 | Rainville | B64D 37/16 |

\* cited by examiner

Nozzel Assemby Disconnected from Tank Flange

Nozzle Assembly Connected to Tank Flange

Cap Lifted

Nozzles Inserted into Tank

Nozzel Assemby Disconnected from Tank Flange

Nozzle Assembly Connected to Tank Flange

Cap Lifted

Nozzles Inserted into Tank

Nozzel Assemby Disconnected from Tank Flange

Nozzle Assembly Connected to Tank Flange

Nozzles Inserted into Tank

SYSTEM AND METHOD FOR THE TRANSFER OF CRYOGENIC FLUIDS

PRIORITY CLAIM

Priority is claimed from U.S. Provisional patent application Ser. No. 62/343,003, filed May 29, 2016, the entire disclosure of which hereby is incorporated by reference.

TECHNICAL FIELD

The present application is directed to the transfer of cryogenic fluids and, more particularly, to a system and method for autonomous liquid hydrogen vehicle refueling.

BACKGROUND

There are many types of Unmanned Aerial Vehicles (UAVs), which are also known as drones. Types of UAV vehicles include multirotors, small hand thrown fixed-wing planes, medium sized vehicles that can be catapult launched or take off from short runways or very large vehicles that can fly around the world conducting reconnaissance missions and launching missiles. A new breed of vehicle called UCAVs for Unmanned Combat Air Vehicles can take off and land on aircraft carriers.

One of the main challenges for UAVs is flight duration. Typical UAVs use batteries or internal combustion engines for propulsion. Batteries are extremely heavy for driving propellers with electric motors, and internal combustion engines are very inefficient at converting aviation fuels (hydrocarbon based) to drive propellers mechanically thus limiting flight duration. A more efficient propulsion system is one that uses hydrogen fuel that is light weight and has the highest stored energy content per unit mass compared to other fuels. By using a very energy efficient fuel cell to convert the hydrogen into electricity to drive the electric motors, extreme durations can be achieved. Table 1 is a comparison of flight duration for the various power systems as modeled for the same aircraft. The power system with the greatest duration is a fuel cell with liquid hydrogen storage.

TABLE 1

| Power/Energy Source for 12 ft. Wing Span UAV | Flight Duration |
| --- | --- |
| Batteries | <1 hour |
| Internal Combustion Engine with Aviation Fuel | 3 hours |
| Fuel Cell with Gaseous Hydrogen Storage | 13 hours |
| Fuel Cell with Liquid Hydrogen Storage | >30 hours |

Liquid hydrogen has a density of 70 kg/m' when stored at 21 Kelvin at 1 atmosphere of pressure. This is a density increase of 2.8 times compared to compressed hydrogen gas storage at 350 bar (5,100 psi) at ambient temperature. Liquid hydrogen is vaporized and warmed using ambient temperatures and a heat exchanger and then is consumed by the fuel cell to make electricity and water, which is released overboard. The fuel cell is typically a Proton Exchange Membrane (PEM) fuel cell, which operates at around 60° C.

A liquid hydrogen powered UAV needs to have fuel transferred into the UAV liquid hydrogen tank from a storage dewar. The transfer process starts by pressurizing the storage dewar with warm gaseous hydrogen also called autogenous pressurization. The warm gaseous hydrogen comes from withdrawing some of the stored liquid and warming it up in a vaporizer. The gas space above the liquid (ullage space) is then pressurized. Pressurization of the storage or supply dewar can be conducted using a gas other than hydrogen such as helium that does not condense in the liquid, which is called non-condensable pressurization. A liquid supply valve is then opened and the pressure pushes the liquid out of the storage dewar and into the UAV liquid hydrogen tank, which is vented to atmospheric pressure during the filling process. Alternatively, a pump can be used to transfer the liquid hydrogen. A comparison of these two prior art processes for transferring liquid hydrogen are shown in FIG. 1.

The transfer equipment used includes transfer lines that are vacuum jacketed and are connected to the dewars with bayonet fittings. The transfer of liquid hydrogen is currently a manual process that involves many hands-on steps. These steps include: physically connecting up transfer equipment such as hoses, flanges, fittings, and bayonets; and conducting flow or pressure purges of the system prior to and after the transfer process in order to maintain cleanliness and to mitigate the generation of combustible mixtures of air and hydrogen. The purges involve connecting up the purge gas source, opening and closing valves, and monitoring pressures per specific pre-determined values based on the volume of the system being purged. In the case of flow purges the time of the flow process is measured based on the volume of the system and the flow rate of the purge gas. The flow rate of the purge gas is measured either by the pressures across the flow valve or a flow measuring device. Vacuum purges may also be done, which require the use of a vacuum pump. The vacuum pump hose is connected to the pump-out port and the vacuum level is measured via a thermocouple bulb or a variety of different vacuum gauges suitable for the vacuum range specified for the purge. The vacuum pump then may need to be disconnected from the system.

When the liquid hydrogen transfer lines get cold, moisture or residual gases will condense and potentially freeze on the cold surfaces. Helium gas is typically used as a purge gas because it has a lower condensation point than liquid hydrogen and is thus called a noncondensable gas in the presence of liquid hydrogen.

Introduction Summary

Drones that require long duration operation using traditional aviation fuels will require in-flight refueling as discussed in U.S. Pat. No. 8,056,860. In-flight refueling is a routine operation for skilled and trained aviators in manned aircraft; however, the '860 patent teaches that drones typically fly slower, so attempting in-flight refueling from manned aircraft that fly much faster is not practical. The patent discusses drone-to-drone refueling and teaches a method of using a magnetic detection scheme for assisting the guidance and control of the standard hose and basket refueling mechanism while two aircraft are moving relative to each other and relative to the ground. The above-mentioned U.S. Pat. No. 8,0567,860 does not teach how to transfer cryogenic fluids or how to use a magnet to mechanically couple the refueling apparatus with the aircraft fuel tank.

Prior art solutions for in-flight refueling with hose couplings are represented by US 2010/0019090 and involved drogues. Drogues are typically used like parachutes to create drag forces to stabilize the refueling hose trailing from a tanker aircraft in a generally horizontal attitude. They provide drag for a refueling coupling at the trailing end of the refueling hose, which is mated with a fuel probe extending from the receiving aircraft. This prior art does not discuss the transfer of cryogenic fluids.

The general problem of refueling cryogenic tanks resides in the need to maintain the fluid in a liquid state through the minimization of adding heat to the fluid also known as heat leak. Heat leak can come from many sources including external convection, conduction, and radiation through piping, penetrations, insulation, and support structures as well as from any energy that comes into the cryogenic system from higher temperature fluids (pressurization fluids) or powered systems (e.g. pumps, instruments).

Heat leak as discussed above that transfers into the dewar will cause the ullage to stratify such that it is at a warmer temperature than the bulk liquid, which can cause measurement issues with knowing the thermodynamic state of the fluid when using tank pressure as the only measurement. U.S. Pat. No. 3,946,572 teaches how to de-stratify the ullage through the use of a pump and an internal spray bar such that the ullage gas temperature is the same as that of the liquid (also known as a saturated state), which allows the user to only have to measure tank pressure to determine the fluid temperature. Another issue that U.S. Pat. No. 3,946,572 addresses is the ability to maintain a specific higher pressure and temperature inside the receiver dewar that is higher than the saturation temperature in the supply dewar. The solution is to use a pump to increase pressure, a heat exchanger to specifically add heat as the fluid transfers to the receiver dewar, and a check valve that is set to only relieve when a certain pressure is reached. With this system configuration both the supply dewar and receiver dewar are capable of maintaining their desired set points.

Another problem that is encountered during the transfer of liquid cryogens from the supply dewar to the receiver dewar is the contamination of the cryogenic liquid by residual gases that are collected as a result of the cryogen production processes. U.S. Pat. No. 5,548,962 teaches the cooling of the liquid prior to or during the transfer to precipitate the solidified residual gases and run them through a filter during the liquid transfer process.

One of the major reasons to transfer hydrogen is to refuel vehicles. Prior art is typically focused on the transfer of gaseous hydrogen such as found in WO 2007/059781 where a system for transferring this hydrogen involves the use of a set of tanks and nozzles on a moving track that connect to a moving vehicle (an automobile) at which time a telescoping arm connects a nozzle for the transfer of hydrogen. There are several problems with telescoping arms and connecting nozzles for the transfer of hydrogen that are not addressed in WO 2007/059781, especially for the transfer of liquid hydrogen. These problems include binding/galling of moving parts, thermal contraction mismatch, and leakage caused by the extreme environment of cryogenic (21 Kelvin) temperatures combined with the transfer pressure. For example, a telescoping nozzle for liquid hydrogen transfer would need to be vacuum jacketed so both the internal pipe and external jacket would need to telescope, which would require a series of cryogenic moving sealing surfaces and seals to keep the cryogenic liquid hydrogen out of the vacuum space and air from the outside out of the vacuum space. Moving cryogenic seals are prone to leakage that destroys the vacuum level, which increases heat leak, which leads to an inefficient transfer of the fluid as it heats up. In addition, leaking seals is a safety issue with hydrogen that may lead to combustion with air if both seals would generate a combustible mixture inside the telescoping refueling arm. The invention disclosed within solves these problems by using a simpler and more reliable approach of moving a nozzle to a receptacle through the use of a robotic arm and a flexible cryogenic bellows and hose designed specifically to remain safe and efficient while flexing under cryogenic operations.

Prior art has attempted to describe the process of transferring liquid hydrogen to flying drones from a series of floating balloons high in the atmosphere as presented in U.S. Pat. No. 8,939,396. This patent teaches the use of balloons that carry equipment to generate hydrogen from water that is pumped up to the platforms carried by the balloons and somehow liquefies it. The liquid is then transferred to flying drones. The problems this prior art does not address are how the hydrogen gas is made from solar power, how the hydrogen is liquefied, how the liquid hydrogen is stored, how the transfer system works, and how to connect the transfer system to the drone.

The transfer of liquid hydrogen from one dewar to another dewar or tank requires the coupling of each end of the fluid transfer piping or hoses to their respective dewars. The coupling is required for a number of reasons including the following: transfer liquid between two locations, maintain a leak free flow path, keep contamination out of the fluid systems, and maintain system pressure. Ideally the coupling will also minimize that transfer of heat from the environment also known as heat leak. Heat leak eventually migrates through the transfer lines and from other locations into the dewars where it tends to warm the liquid or ullage gas or both. Warming of the fluids is undesirable as it may lead to pressure build up and the need for the tank to relieve pressure through a series of relief devices such as relief valves, vent valves, or burst disks. Warming of the liquid also decreases density, which limits the quantity of fuel that can be put into the vehicle tank and decreases vehicle flight duration.

There are a variety of coupling methods that include fittings, flanges, field fit joints, and bayonets.

Fittings are not vacuum jacketed insulated so that wrenches can be applied to mechanically tighten the threaded connections with a seal or gasket between the compressed parts. Because they are not vacuum jacketed, fittings are a source of high heat leak leading to an inefficient transfer of liquid due to excess boiling, which is undesirable in transferring liquid cryogens, especially liquid hydrogen because each unit mass that is converted from liquid to gas becomes unusable in the aircraft liquid hydrogen tank and is wasted.

Flanges are considered temporary sealing methods that involve multiple bolts for clamping force so that the interfaces can be disconnected. Flange seals may involve o-rings in grooves or serrated surfaces with flat gaskets. The flanges can be insulated but are not vacuum jacketed and thus have a higher heat leak, which is a similar problem as described for fittings.

Field joints are made by welding two ends of the pipe together making a permanent seal that can then be insulated around and inserted into a vacuum jacketed pipe to minimize heat leak. So although the heat leak has been minimized it becomes very impracticable to disconnect the two pipes that are joined together and these types of joints cannot be used for refueling of liquid hydrogen vehicles rapidly.

Finally, cryogenic bayonets are designed to minimize heat leak from a transfer system to the dewar via their long length and the trapping of gas between the inner and outer thin-walled tubes. Seals are typically o-rings at the warm end. The cold end may have a Teflon type seal as well. Bayonets have a flange on the outer tube that mounts to another flange on the tank or dewar. The flanges are connected via bolts or band clamps. The band clamps are quicker to remove than the bolted flanges. The problem with bayonets is that they are heavy due to the long lengths, vacuum jacketed tubes, flanges, and bolts/clamps, which significantly impact the weight of the aircraft. The invention disclosed within solves this problem through the use of a refueling coupling assembly.

Vacuum jacketed valves are used for isolating the flow of cryogenic fluids through piping systems and from tanks. The valves have an additional housing called the vacuum jacket around the valve to minimize heat leak into the piping/tank system to keep the liquid from boiling away. The valve and its associated vacuum jacket are made of metal to survive the cryogenic temperatures and handle the pressure and thus are very heavy. The weight of these valves make it prohibitive to use on UAVs where weight is a critical performance parameter, the more weight the less performance.

Bellows are used in cryogenic piping systems to allow the passive contraction and expansion of the pipes as they cool down or warm up respectively. Bellows are welded in place between two pipes to form a permanent seal that maintains the integrity of the piping system to handle the pressure, temperature, and flow of cryogenic fluids. In vacuum jacketed piping, bellows are used on the inside pipe as well as the vacuum jacket (or outer pipe). The bellows in both pipes are welded in place.

Safe transfer of liquid hydrogen through piping systems requires the use of a noncondensable gas to purge the piping system to remove air and water vapor prior to the flow of cryogenic liquid hydrogen through the system. The noncondensable gas is also used to purge out residual hydrogen gas after the flow of liquid hydrogen is complete in order to "safe" and "clean up" the system. Air removal is a requirement to eliminate the possibility of generating a combustible mixture of oxygen and hydrogen in the system. The only gas that does not condense at liquid hydrogen temperatures is helium. Helium is an expensive gas and is a nonrenewable resource here on Earth. Methods that could be used to minimize or eliminate the use of helium for pre and post liquid hydrogen transfers is highly desirable, which is one problem the disclosed invention solves. The use of vacuum to remove the air in the system can be done as well. Nitrogen gas can be used as a purge gas when the piping surface temperature is above the saturation temperature of nitrogen at the piping purge pressure.

SUMMARY

Each of these prior art solutions fails to disclose/teach a method/apparatus for safe, efficient, and rapid coupling of liquid hydrogen fluid transfer equipment for drones. The system disclosed herein provides specific teachings of how to create a removable vacuum jacketed nozzle through the use of expandable and contractible bellows. It also teaches the specific design of a nozzle and sealing surface that when compressed together by the force of a robotic arm pushing on the bellows form a sealed passage sufficient for the transfer of liquid hydrogen into the drone liquid hydrogen tank and then can be quickly disconnected, without the need to unbolt or unclamp as discussed in prior art, by simply pulling the nozzle away with the robotic arm to expand the bellows. The prior art does not teach of a specific coupling mechanism that involves the use of magnets or electro-magnets embedded in mating flanges that form the vacuum seal around the nozzle and the tank refueling port. The prior art does not teach of a removable cap that is needed during normal flight operations to keep the tank pressurized yet can be used as a pressure relief if the tank over pressurizes. The removable cap eliminates the need on the flight vehicle for a shut-off valve, which would be heavy, would add mass to the flight vehicle and would require electric power to keep it closed, if it is a normally opened valve thus leading to an energy inefficiency of the overall vehicle system. The prior art does not teach about a mechanism for removing the cap, while the vacuum jacket is in place. The prior art does not teach a method by which to automatically control each of these mechanisms and the control of vacuum and nitrogen purge gas at various steps in the process. This leads to a safe transfer and eliminates air in the system which could form a combustible mixture with residual hydrogen. The prior art does not teach of the specific measurements needed to implement the automated processes such as 1) the displacement of the bellows, 2) the force on the nozzle for sealing, 3) the temperature of the surfaces within the subsystem for monitoring for moisture freeze out, 4) species sensors for measuring the quantity of hydrogen in the vacuum space, and 5) the pressure within the vacuum space for purging and vacuum processes, and a liquid/vapor detector in the fill nozzle to control the filling process.

Advantages over the prior art are herewith provided in the following disclosure.

Set forth herein are several of the inventive features of the disclosed system and method for the transfer of cryogenic fluid. An automated system for refueling and venting liquid hydrogen systems. A flange mating system including embedded electro-magnets, vacuum, and a robotic arm to provide compressive forces for sealing the mating flanges thus eliminating the need for bolts or clamps as required in prior art for manual mating of flanges. A flexible bellows to provide a collapsible chamber to allow the internal nozzle to be inserted into the seal while maintaining the vacuum and nitrogen purge capability. A method of using a flexible bellows vacuum and purge chamber that eliminates the need for expensive and non-renewable helium gas for pre and post fluid transfer purging operations. A removable hinged cap that provides pressure relief during normal flight operations. A mechanism including a rotating shaft and gear drive that penetrates the vacuum chamber wall using a fluidic seal and mechanically drives the cap open during the refueling process, which enables automated robotic removal of the cap under vacuum and purged conditions. A transfer tube nozzle compression fitting with a specially designed tapered compression feature for compressing on a tapered tank flange seal. A method for operating the apparatus that allows for the safe, efficient, and rapid transfer of cryogenic fluids under automatic control using feed-back from a variety of sensors on the condition and position of the apparatus and hydrogen tank.

Accordingly, one aspect of this disclosure relates to a refueling system for aircraft includes a fuel storage container mounted on a support platform, the support platform positionable above a refueling station providing space for an aircraft beneath the support platform to permit positioning of an aircraft beneath the support platform for refueling, and a connection system connectable to an aircraft to supply fuel from the storage container to an aircraft located in the space.

Optionally, the fuel storage container includes a cryogenic fuel storage container, and the connection system includes a refueling coupling assembly.

Optionally, the system further includes a sensor system configured to align an aircraft with the connection system for supplying fuel to the aircraft.

Optionally, the system further includes a cryogenic fuel generator on the support platform and a power source and control panel configured to control operation of the cryogenic fuel generator to generate cryogenic fuel and the connection system for connection to an aircraft fuel system.

Optionally, the system further includes an isolating system configured to protect the environment in which at least part of the connection system is located during the coupling of cryogenic fuel from the fuel storage container to an aircraft.

Optionally, the support platform is movable on wheels.

Optionally, the support platform is a movable trailer.

Optionally, the coupling system includes a cryogenic fuel transfer system with insulation to minimize thermal conduction, a nozzle, an isolation space, and a seal to connect with a cryogenic fuel tank inlet of an aircraft.

Optionally, the system further includes positioned on the support platform an electrolyzer configured to convert water to its constituent components hydrogen and oxygen, and a refrigeration apparatus to refrigerate the hydrogen to cryogenic liquid hydrogen.

Optionally, the system further includes an alignment system including sensors to facilitate aligning the fuel input of an aircraft with the coupling system for transferring cryogenic fuel to the aircraft.

Another aspect relates to a cryogenic fuel transfer system, including, a fuel nozzle configured to couple cryogenic fuel from a source to a fuel tank inlet, and a bellows positionable with respect to the nozzle and fuel tank inlet with respect to which the bellows may be moved for supplying fuel to the fuel tank inlet to provide a confined volume at which connection may be made between the nozzle and the fuel tank inlet.

Optionally, the system includes a seal configured to seal with the fuel tank inlet, and further includes a fluid connection to the confined space to evacuate gas from the confined volume.

Optionally, the system includes a vacuum source coupled to the fluid connection to evacuate gas from the confined volume.

Optionally, the seal is configured to cooperate with vacuum in the confined volume to enhance the sealing with the fuel tank inlet.

Optionally, the bellows is attached to move together with the nozzle toward and away from a fuel tank inlet respectively compressing and expanding the bellows.

Optionally, the system further includes a mechanical support configured to move the nozzle and bellows with respect to a fuel tank inlet.

Optionally, the system includes a controller configured to automatically sense relative positions of the nozzle and bellows and of the fuel tank inlet to sense and to control alignment of the nozzle and bellows with respect to the fuel tank inlet.

Optionally, the system includes a fuel tank inlet seal component and a nozzle seal component, and wherein the seal components are cooperative to seal connection between the nozzle and the fuel tank inlet to tend to avoid leakage of fuel.

Optionally, the system includes magnets cooperative to hold together the seal components to maintain the sealing.

Optionally, the magnets include electromagnets operable to pull together the seal components to effect sealing and to release the pulling together of the seal components.

Optionally, the bellows is attached to the nozzle seal component.

Optionally, the system includes a movable cap positionable in the confined volume movable selectively to open and to close access to the fuel tank inlet.

Optionally, the movable cap is attached to the fuel tank inlet.

According to another aspect, a seal for cryogenic fluid transfer apparatus, includes first and second flanges each having a substantially fluid impermeable portion and an opening through the fluid impermeable portion, the flanges positionable with respect to each other to align the openings with respect to each other to pass fluid therebetween, a seal ring positionable between the fluid impermeable portions, and at least one flange including serrations configured to bite into the seal ring.

Optionally, both flanges have serrations.

Optionally, the seal ring further includes magnets configured to hold the flanges together with the seal ring therebetween.

According to another aspect, a cryogenic fluid system, includes a cryogenic fluid storage tank having an inlet, a cap movable between open and closed positions with respect to the inlet, a cryogenic fluid supply assembly including a nozzle positionable with respect to the cryogenic fluid storage tank inlet to supply cryogenic fluid to the storage tank via the inlet, an isolation assembly movable with respect to at least one of the cryogenic fluid storage tank inlet and the cryogenic fluid supply assembly configured to provide a variable volume enclosure in which the inlet and nozzle may be coupled to transfer cryogenic fluid from the nozzle into the tank via the inlet.

Optionally, the isolation assembly includes a bellows.

Optionally, the cap is movable in the variable volume enclosure.

Optionally, the system further includes a vacuum source coupled to evacuate the space of gas.

Optionally, the system further includes a sensor configured to sense movement and/or position of the isolation assembly.

Optionally, the system further includes a control responsive to the sensor to control movement of the isolation assembly.

Optionally, the system further includes a sensor configured to sense a gaseous species in the volume.

Optionally, the system further includes a temperature sensor positioned to sense temperature of at least one of the variable volume or physical parts of the system.

According to another aspect, a method for refueling a vehicle with cryogenic fluid, includes effecting alignment of a refueling station and a vehicle, sensing acceptable alignment, moving a nozzle to position with respect to a fuel inlet of the vehicle and moving an isolation assembly to provided isolated space in which the connection between the nozzle and fuel inlet is located, sealing connection between the nozzle and fuel inlet, and dispensing cryogenic fluid fuel from the nozzle to the fuel inlet.

Optionally, the effecting alignment includes using sensors to sense position, and autonomously aligning the refueling station and vehicle.

Optionally, the method further includes opening a cap from closed position closing the fuel inlet to an open position for insertion of the nozzle with respect to the fuel inlet.

Optionally, the sealing includes magnetically holding parts of a seal together.

Optionally, the method further includes vacuum purging the area of the nozzle and fuel inlet outside of the flow path of fluid from the nozzle into the fuel inlet.

Optionally, the method further includes applying a vacuum in the isolated space to enhance sealing of the connection between the nozzle and fuel inlet.

Optionally, the method further includes performing a nitrogen purge of the isolated space after completing refueling of the vehicle.

According to another aspect, a system for cryogenic fluid transfer, includes
a cryogenic fuel tank including:
a tank body having at least one tank body opening between an interior tank surface and an exterior tank surface;
a flexible gasket affixed to the tank body and surrounding the at least one tank body opening while outwardly extending from the exterior tank surface;
a cap mounted to the exterior tank surface and configured to moveably cover and uncover the at least one tank body opening by engaging and disengaging the flexible gasket;
a first embedded magnetic mating flange surrounding the flexible gasket and the cap; and
a cryogenic refueling assembly including:
a supply hose;
a robotic arm rigidly attached proximate to an opening in the supply hose; and
a bellowed coupling assembly that bounds, at least in part, an interior bellow volume that is defined between a compressible wall surface and a proximal end wall, wherein the bellowed coupling assembly is rigidly connected to the robotic arm and in fluid communication with the opening in the supply hose, wherein a distal end of the compressible wall surface is surrounded by a second embedded magnetic mating flange, the bellowed coupling assembly further includes:
a nozzle having a proximal end and a distal end, wherein the nozzle proximal end is rigidly connected to the bellowed coupling assembly proximal end and is in fluid communication with the opening in the supply hose, wherein the nozzle distal end is concavely configured to mate with the flexible gasket;
a vacuum purge port disposed interior to the interior bellow volume;
a heating element; and
at least one sensor configured to monitor at least one condition of the interior bellow volume; and
a controller configured to monitor the at least one sensor and drive the robotic arm in response to at least one condition of the interior bellow volume.

According to another aspect, a method for cryogenic fluid transfer, includes the steps of:
initiating a refueling sequence when a cryogenic fuel tank approaches a bellowed coupling assembly of a cryogenic refueling assembly;
mating of a first embedded magnetic mating flange of the cryogenic fuel tank and a second embedded magnetic mating flange of the bellowed coupling assembly;
monitoring at least one condition of an interior bellow volume of the bellowed coupling assembly through at least one sensor mounted therein;
conditioning the interior bellow volume through vacuuming, heating, and purging;
disengaging a cap from a flexible gasket affixed to the cryogenic fuel tank, thereby uncovering an opening into the cryogenic fuel tank;
moving a robotic arm to align a distal end of a nozzle of the bellowed coupling assembly with the opening into the cryogenic fuel tank;
moving the robotic arm towards the cryogenic fuel tank to compress a compressible wall surface of the bellowed coupling assembly;
engaging the distal end of the nozzle with the flexible gasket;
dispensing cryogenic fuel into the cryogenic fuel tank;
ceasing the dispensing of the cryogenic fuel into the cryogenic fuel tank;
moving the robotic arm away from the cryogenic fuel tank to uncompress the compressible wall surface;
disengaging the distal end of the nozzle from the flexible gasket;
engaging the cap with the flexible gasket, thereby covering the opening into the cryogenic fuel tank;
monitoring at least one condition of the interior bellow volume;
conditioning the interior bellow volume through vacuuming, heating, and purging; and
unmating of the first embedded magnetic mating flange and the second embedded magnetic mating flange.

Other objects and advantages of the disclosed system and method for transfer of cryogenic fluids will be apparent from the following description, the accompanying drawings, and the appended claims.

BRIEF DESCRIPTION OF THE DRAWINGS

The concurrently filed figures represent various perspectives (e.g., from above, below, side views, individual component views, combined system views) of one embodiment of the present invention. A person of ordinary skill in the art would understand that the specific components depicted in these figures are only representative and are not limiting. As such, the present invention does not lie in any single component, but rather in the collection of components described in their arrangement. And a person of ordinary skill would understand the present disclosure to teach the invention described as well as those embodiments that replace certain disclosed components for components that serve similar purposes and will not disturb the novel features of the present invention.

FIG. 6 is a cross section of knife edge serrated flanges with gasket in-between.

DESCRIPTION

The disclosed cryogenic refueling system and method can be used for the transfer of liquid hydrogen and venting of gaseous hydrogen in either stationary ground applications or inflight applications as will be discussed further.

Figures 1A, 1B:
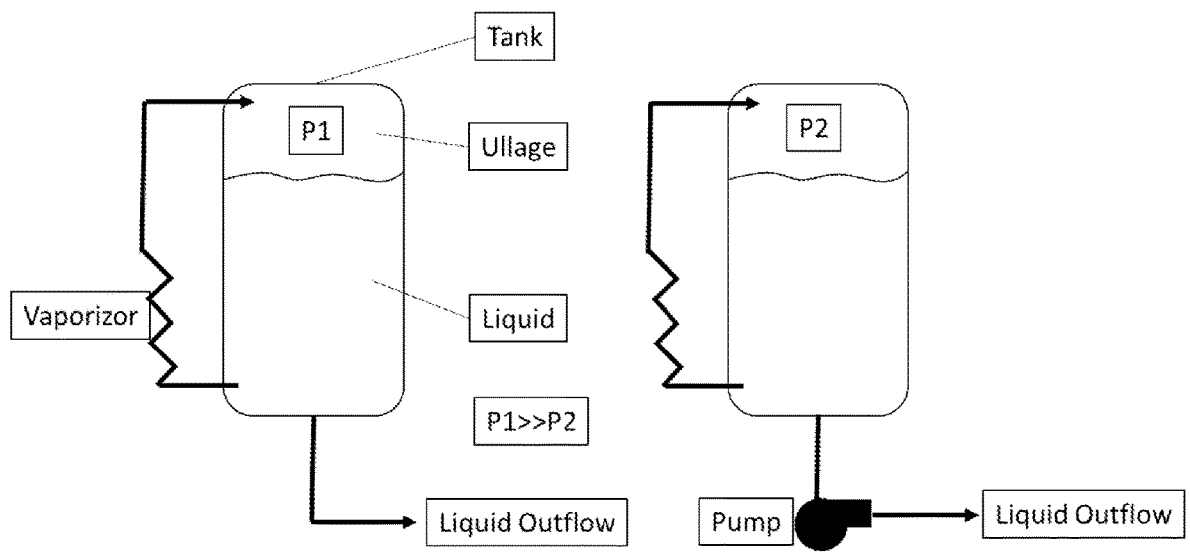
FIGS. 1A and 1B, respectively, are a flow diagram showing two different fluid transfer processes (a) pressurization and (b) pump.
Figure 2:
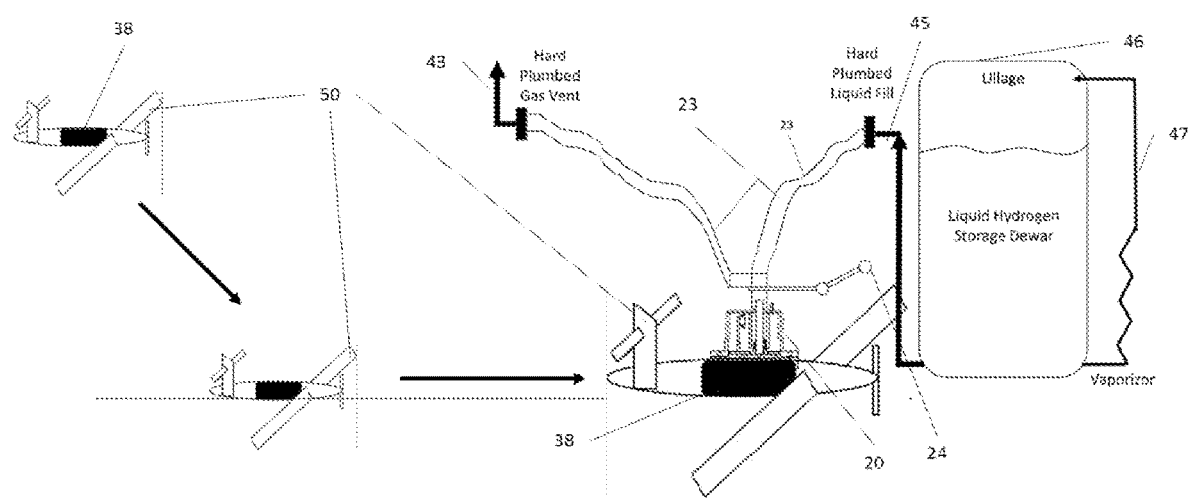
FIG. 2 is an illustration of a UAV being refueled with liquid hydrogen.

FIG. 1 is discussed above.

As shown in FIGS. 2-5 an embodiment of the disclosed system and method for the transfer of cryogenic fluids begins with the process of refueling a UAV 50 with liquid hydrogen. The liquid hydrogen tank 38 or dewar on board the UAV 50 is designed to contain 21 to 33 Kelvin liquid hydrogen at tank pressures ranging from 15 psia to 200 psia. The UAV 50 can be any type of aerial vehicle such as fixed-wing or rotary type. The system and method for the transfer of cryogenic fluid disclosed herein also or alternatively may be used to transfer cryogenic fluids to other vehicles, e.g., cars, trucks, ships, other aircraft, and so on. A fixed-wing aircraft is depicted in the figure. The UAV is flying autonomously when the aircraft liquid hydrogen quantity sensor indicates the UAV needs to refuel. The autopilot then flies the UAV to the nearest airport with liquid hydrogen refueling. The UAV autonomously lands and taxies over to the refueling station using the Global Positioning System (GPS) coordinates. As the UAV approaches the station, additional sensors are used such as optical or laser detection to position the UAV under the refueling coupling assembly. An optical system 60 inspects the hydrogen tank flange 13 (seal portion or seal component) for final alignment and detection of any potential problems that would put the process on hold. Once permissions are given by the system, the process as described below is implemented. Once the process is complete and the refueling coupling assembly 20 is removed, the UAV 50 taxies back to the runway and continues flight operations.

Figure 3:
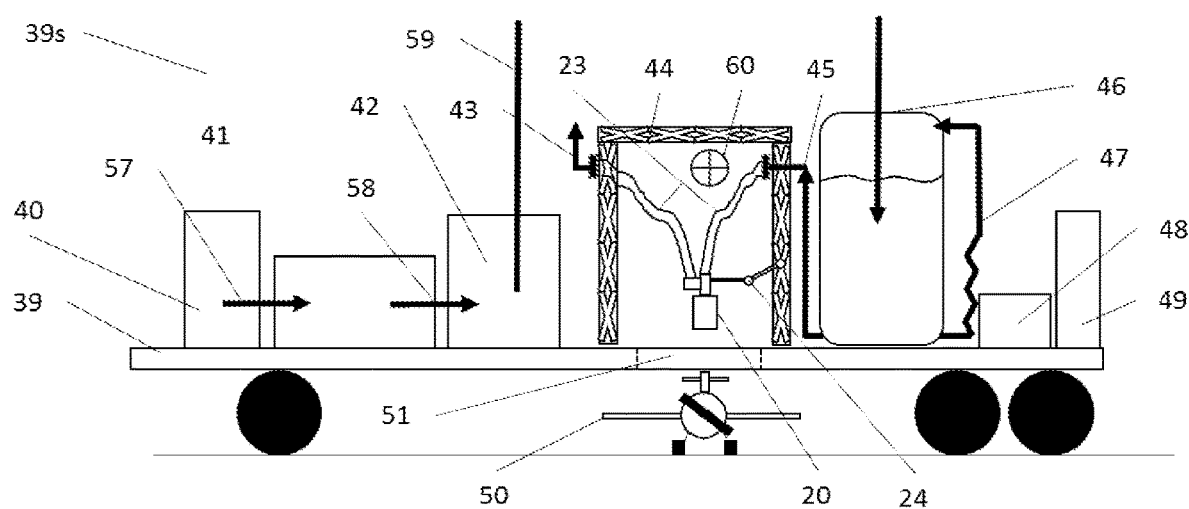
FIG. 3 shows a flatbed trailer mobile liquid hydrogen refueling station.

FIG. 3 shows a flatbed trailer 39 that serves as a mobile liquid hydrogen refueling station that can be parked at any airport or field operation for UAVs. The refueling station 39 has on it a number of components for the generation and storage of liquid hydrogen from water. At one end of the flatbed support platform is a cabinet 40 for the hook up of local utilizes such as power, water, and gaseous nitrogen for purging. The cabinet contains storage tanks of water and bottles of gaseous nitrogen that are replenished from the local supply hook ups. The power and water flow into the electrolyzer 41 to generate oxygen and hydrogen gas as shown by the arrow 57. The electrolyzer 41 can be a Proton Exchange Membrane type. The oxygen can be vented to atmosphere or used in other processes that are not discussed here. The gaseous hydrogen flows to the liquefier 42 where the hydrogen is chilled down and liquefied. The electrolyzer 41 and liquefier 42 are a cryogenic fuel generator. Arrow 58 shows the flow of gaseous hydrogen from the electrolyzer 41 to the liquefier 42. The liquefier needs to be sized with a cryogenic refrigerator or cryocooler with sufficient refrigeration power to make liquid hydrogen. A catalyst may be inserted in the dewar or flow lines to rapidly conduct the ortho-hydrogen to para-hydrogen conversion prior to flowing the liquid hydrogen into the storage dewar 46 as shown by arrow 59. The UAV 50 is shown under the cutout 51 in the middle of the flatbed trailer 39. The cutout 51 is an opening in the flatbed that allows direct and indirect connection of signals and of fluids between the UAV 50 and the refueling system. The refueling coupling assembly 20 is shown disengaged from the UAV 50. When engaged, liquid hydrogen is pressure fed from the storage dewar 46 using the vaporizer 47 to use some of the liquid to pressurize the dewar. As the UAV liquid hydrogen tank 38 is refilled, any vapor that is generated goes out the hard plumbed vent 43. A structure 44 used over the cutout 51 supports all plumbing, hoses, vents, hard plumb connections, tubing, instrument wires, lighting, sensors such as hydrogen detectors, optical sensors 60 for monitoring position and operations, and any valving associated with the refueling station. A fuel cell 48 that consumes residual hydrogen gas from the vent or the dewar is used to provide power to operate the system when utility hook up is not available due to planned or emergency operations. A control panel 49 is located at an end of the flatbed trailer 39 to house all the controls, power supplies, electrical contacts, safety systems, and local readouts to operate the refueling station on an as needed bases. Once filled, the UAV 50 proceeds through the other side of the flatbed trailer 39 and heads out to the runway. The refueling station 39s including the flatbed trailer 39, can then be transported to any airport to support the liquid hydrogen UAVs.

Figures 4A, 4B, 4C, 4D:
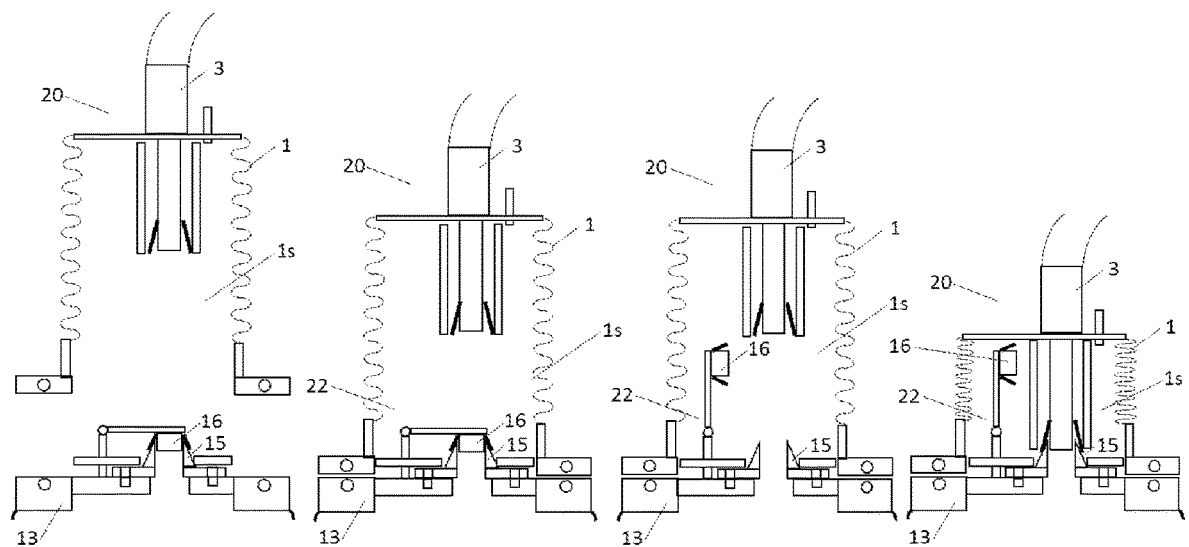
FIGS. 4A, 4B, 4C, and 4D (sometimes referred to collectively as FIG. 4) are cross sections of the nozzle couple assembly in four different positions corresponding to disengagement, engagement, cap opening, and nozzle insertion.

The method of refueling is as follows and is illustrated in FIG. 4 with the main components shown in FIG. 5. FIG. 4 shows the four main types of positions the refueling coupling assembly 20 goes through during nominal operations. The first position (A) is the disengaged position where the refueling coupling assembly 20 is hovering above the hydrogen tank flange 13. The next position (B) is the mating of the flanges with the bellows 1 still in the extended position. The next position (C) shows opening of the cap 16 exposing the tank flange seal 15. The final position shown (D) is the engagement of the nozzle 3 on the tank flange seal 15. The bellows 1 is expandable and contractible. In its contracted state for fueling, the volume or space 22 within the bellows provides an isolation space or volume to avoid leakage of gas (or other species) to the environment external of the bellows. Also, a vacuum (discussed below) may be applied to the isolation space or volume to remove any species therefrom, e.g., during the process of transferring cryogenic fluid.

Figure 5:
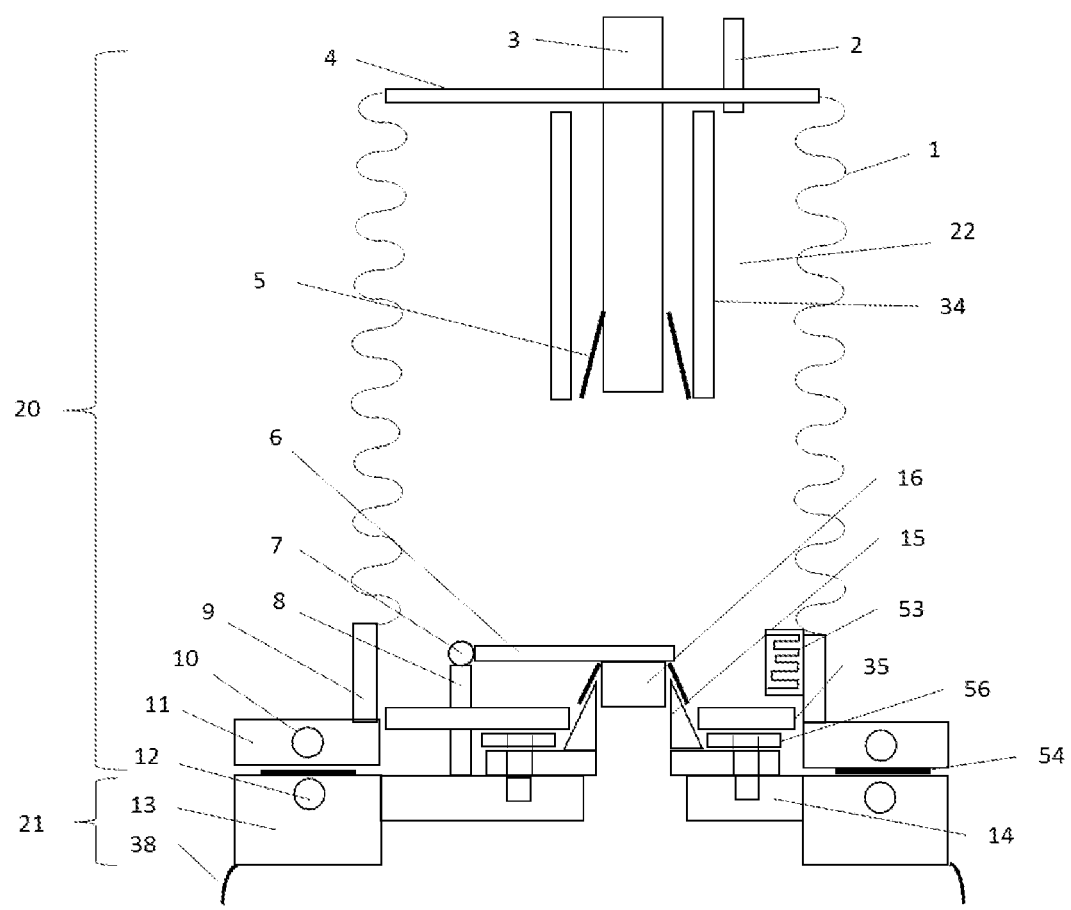
FIG. 5 is a cross section of the fluid transfer refueling coupling assembly attached to the UAV liquid hydrogen tank.

FIG. 5 shows the refueling coupling assembly 20 brought into contact with the tank flange assembly 21, which is constructed within the fuel tank 38. The mating surfaces are the coupling flange 11 and the tank flange 13, which are cryogenic fluid fuel impermeable. An opening in each flange aligns with each other for the nozzle to pass fuel into the fuel tank inlet. The magnets 10, 12 buried within the flanges 11, 13 are activated to maintain the connection between the two assemblies. One or the other or both flanges have serrations 55 (FIG. 6).

Figure 6:
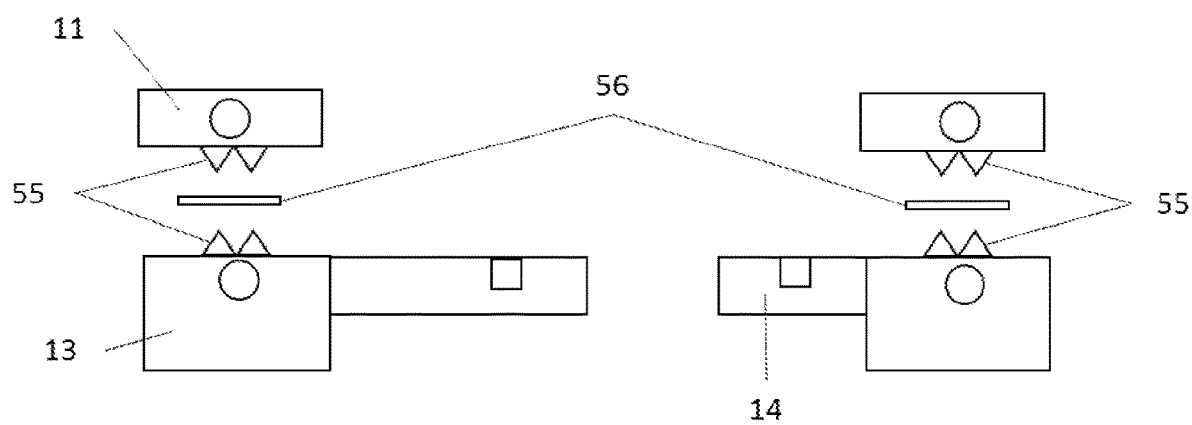

The serrations 55 shown in FIG. 6 are knife edges that bite into the coupling flange gasket 54 material and make a seal on the tank flange 13. The coupling flange gasket 54 is flat with the preferred material being Kel-F or material having similar or suitable properties. A vacuum is pulled using a vacuum pump through the vacuum/purge port 2. The vacuum/purge port 2 is a tube in fluid contact with the vacuum space 22 to which a vacuum hose is attached leading to a vacuum pump. The vacuum/purge port 2 is also connected into a purge gas source via a tee in the line and tubing leading to a source of high-pressure purge gas such as nitrogen. A heating element 53 is located within the coupling assembly to warm components when necessary to reach certain temperature criteria during the refueling process.

Figure 7:
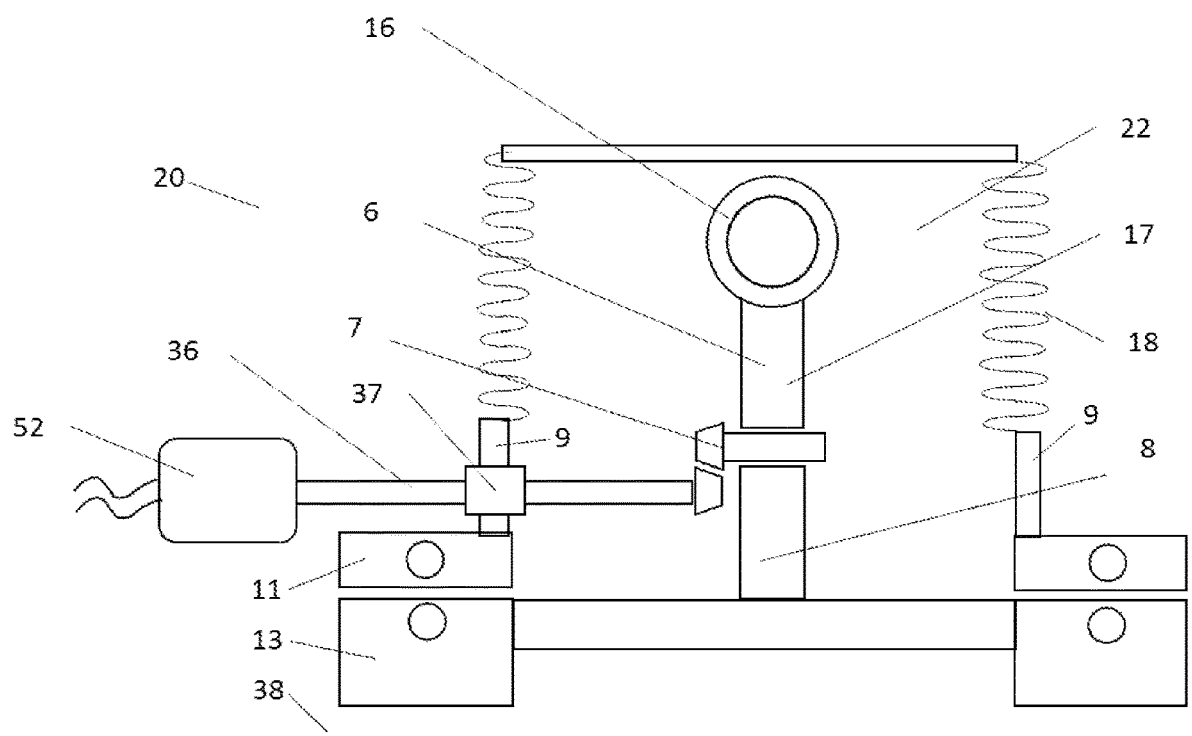
FIG. 7 is a cross section of the refueling coupling assembly that shows the mechanical gear mechanism for opening the spring loaded cap.

FIG. 7 is a cross section of the refueling coupling assembly 20 that shows the mechanical gear mechanism for opening the spring loaded cap 16. As is shown in FIG. 7, the spring loaded cap is in its fully opened position 17 while the bellows is in its fully contracted position 18. A rotary gear drive shaft 36 is linearly actuated into the vacuum space 22 and engages the spring hinge 7, which has a mating gear. The rotary gear drive shaft 36 may also provide a path for electrically grounding the liquid hydrogen tank 38. The spring hinge 7 provides a normally closed cap 16 and requires a force to reverse the spring and open the cap. The spring hinge 7 is supported off the tank flange face 14 by the hinge base 8. The rotary gear shaft 36 penetrates the coupling wall 9 from the side using a ferro-fluidic rotary seal 37. The coupling wall 9 connects the other end of the bellows to the coupling flange 11. The coupling wall 9 provides a solid surface to mount feed-through penetrations to pass devices such as wires and mechanical components into the vacuum space 22 from the outside, including the ferro-fluidic rotary seal 37. The ferro-fluidic rotary seal 37 is designed to provide mechanical (translational and rotational) access to vacuum spaces without breaking the vacuum seal. The rotary gear is activated in a rotational mode using an intrinsically safe electric drive motor 52 and provides the force need to reverse the spring of the spring hinge 7 and raise the cap arm 6, which the cap 16 is mounted to. The cap 16, which is the primary liquid hydrogen tank sealing device, is designed with identical sealing features as the tube nozzle compression fitting 5.

The spring hinge 7 is designed to allow pressure relief of the liquid hydrogen tank 38. When the UAV 50 consumes less hydrogen fuel than the natural heat leak of the liquid hydrogen tank 38, which generates boil-off gas, the tank will pressurize. The tank is designed to operate at a maximum expected operating working pressure and a relief device is necessary to keep the tank from bursting. The spring hinged cap 16 is the relief device. Other methods of holding the cap in place with a force can be envisioned include other combination of spring loaded clamps, belleville washers, magnets, and cryogenic "rubber" bands made out of Kapton, which is flexible at cryogenic temperatures. The spring hinge 7 also has the feature to re-seat on the tank flange seal 15 once the pressure has been relieved because of the restoring force of the spring of the spring hinge.

An alternative embodiment of the cap 16 is one that has a flapper inside the cap 16 that would open when pushed down by the refueling tube nozzle 3. In this configuration the spring hinge cap 16 would still serve as a pressure relieve device but would not have to be removed for refueling. The flapper would have to be spring loaded in order to be normally closed. A cryogenic seal would need to be included in the passageway through the cap 16 or as part of the nozzle 3. This can be accomplished with Kel-F o-rings on the outer diameter of the nozzle 3 or the inner diameter of the cap 16.

Figure 8:
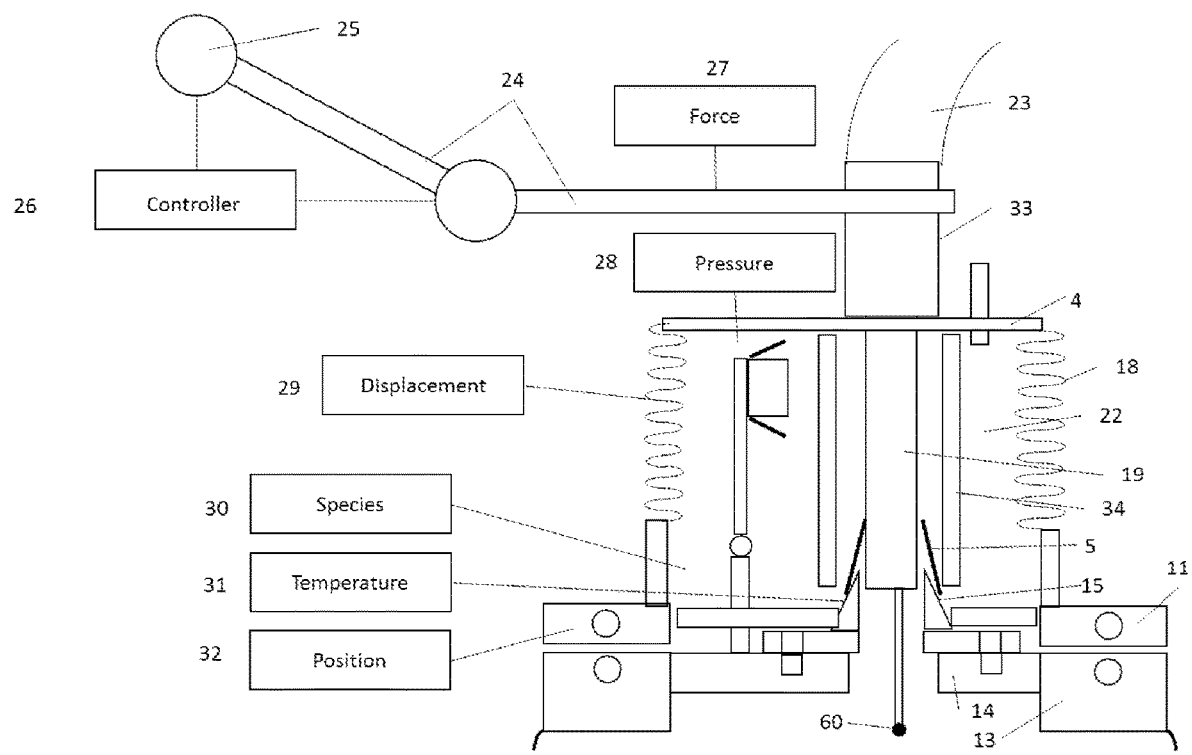
FIG. 8 is a cross section of the refueling coupling assembly connected to a remote controlled robotic arm that uses various sensory input for control.

The robotic arm 24 (FIGS. 3 and 8) then drives the bellows flange 4 down, compressing the bellows 1 until the fluid transfer tube nozzle compression fitting 5 (FIG. 5) engages the tank flange seal 15. The bellows flange 4 forms one end of the vacuum space 22 by attaching the bellows to it via welded construction. The robotic arm 24 as shown in FIG. 8 is connect to the nozzle vacuum jacket 33, which is connected to the bellows flange 4. The robotic arm when stationary and in the proper position keeps the bellows 1 from collapsing while the vacuum space 22 is evacuated to at least $10^{-4}$ torr. The nozzle 3 is shown in FIG. 8 in its engaged state for refueling 19 by sealing on the hydrogen tank seal and the bellows is in fully compressed state 18.

The tube nozzle 3 is designed to allow liquid hydrogen to flow from the vacuum jacketed hose 23 into the UAV liquid hydrogen fuel tank. The tube nozzle 3 is machined fabricated with an integral compression fitting 5 designed to compress on the tank flange seal 15. The tank flange seal should have a taper angle of between about 25 and about 45 degrees, preferably about 35 degrees. The tank flange seal 15 is held in place by direct bolting to the tank flange face 14 or by the over-lay of a tank flange seal ring 56 (FIG. 5), which can then compress the tank flange seal 15 to the tank flange face 14. The transfer tube nozzle 3 does not need to be centered within the bellows 1 due to the controllability of the robotic arm 24 to place mating flanges 11, 13 in their proper position. The transfer tube nozzle 3 is insulated with insulation 34 to minimize heat leak. The preferred insulation is multilayer insulation (MLI) with alternating layers of double aluminized Mylar and Dacron netting spacers. Alternative insulation than be used in combination with MLI is spray-on foam insulation (SOFI). Insulation 35 (FIG. 5) such as SOFI is also placed over the tank flange face 14 and tank flange seal 15 to minimize heat leak into the tank. The vacuum space 22 is continued to be pumped on. The liquid hydrogen is then transferred into the fuel tank.

When the filling process is complete the bellows 1 are raised up and the cap arm 6 is placed back down onto the tank flange seal 15. The vacuum system is maintained for a period of time to remove residual hydrogen gas and then nitrogen is purged into the bellows area. Temperature sensors 31 on the cap 16 are monitored for nitrogen freezing temperatures. Other temperature sensors can be installed to monitor wall temperatures to minimize freezing of water vapor. A heating element 53 within the assembly can be used to increase the warm up time as required.

In FIG. 8 the measurement and control aspects of the innovation are shown. The figure shows the nozzle vacuum jacket 33 that is welded to the bellows flange 4. A vacuum jacketed transfer hose 23 is welded to the outside nozzle vacuum jacket 33 and the inside nozzle 3. The vacuum jackets are necessary to minimize heat leak to the liquid hydrogen that will cause vaporization. The robotic arm 24 attaches to the nozzle vacuum jacket 33. The robotic arm may be a movable mechanical support for one or more parts to which it is attached. The robotic arm is controlled by any number of intrinsically safe electric motors 25 to provide the degree of freedom needed to accomplish the assembly mating process. The motors are intrinsically safe for operation in a hydrogen environment or may be purged with nitrogen gas. The controller 26 controls the robotic arm 24 by remote operation or by automatic operation using feedback from a number of sensors including force 27, pressure 28, displacement 29, species 30, temperature 31, and position 32 sensors.

Examples of feed-back information for control include the following. The force sensor 27 measures the amount of force being exerted onto the nozzle 3 by the robotic arm 24, which is used by the controller 26 to keep the forces within predetermined limits for maximized sealing capability not to exceed structural limits on the equipment or the UAV 50. The species sensor 30 measures the amount of hydrogen and oxygen in the vacuum volume 22, which is used by the controller 26 to compare with flammability limits thus enabling the a safe filing process to proceed or continue. Exceeding flammability limits would result in an emergency shutdown where the filling process would discontinue. Pressure measurements 28 within the assembly are used to determine vacuum levels, over pressurization levels, or nominal pressure levels that depending on which steps in the process, provide information for safety purposes and equipment operational condition monitoring. The temperature sensors 31 provide information on the status of the equipment in order to proceed to the next step. The temperature of the cap 16 after the filling process is complete is of interest to maintain above 90 K so that liquid oxygen will not form on the cap after the assembly is disengaged from the system and exposed to ambient air conditions. The displacement sensor 29 on the bellows 1 determines the position of the nozzle 3 and enables the controller 26 to know the bellows 1 is operating within acceptable limits.

Figure 9:
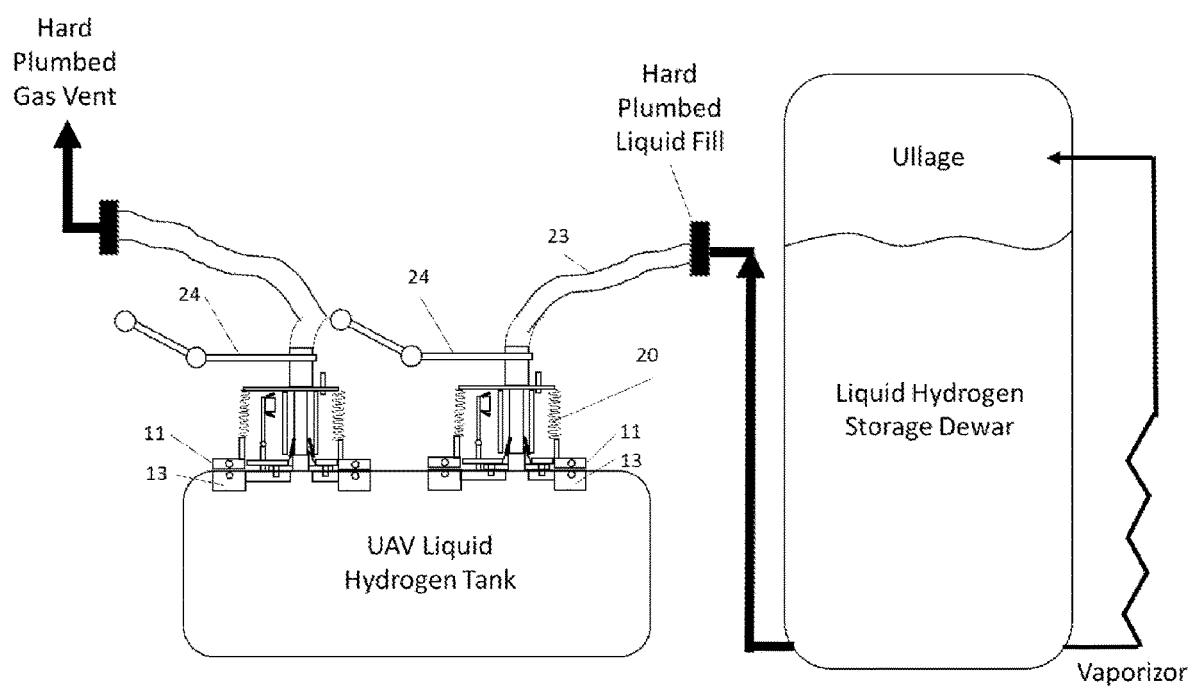
FIG. 9 is a flow diagram of the method for refueling a UAV with liquid hydrogen using the refueling coupling assembly.

FIG. 9 shows the apparatus attached to the UAV liquid hydrogen tank for both the liquid fill and the vent. The figure by virtue of the arrows shows the liquid hydrogen being pressure transferred out of the storage dewar through hard plumbing to the flexible vacuum jacketed hose 23. Also shown is a hard plumbed vent attached to a second apparatus that is used for venting the tank during the filling process.

To protect the magnets in the tank flange 13 from picking up debris when not being refueled, a removable cover could be attached. The preferred material is Teflon that can withstand the cold temperatures on the tank. An alternative material could be Kel-F.

An alternative to the permanent magnets 10 are electromagnets that can be actively controlled.

Figure 10:
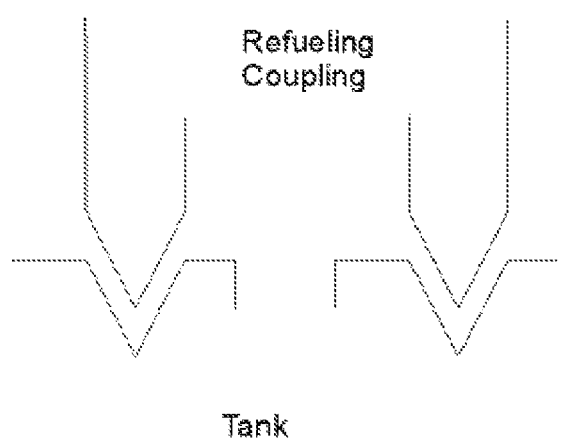
FIG. 10 is a diagram illustrating the use of a v-grove to center and guide the coupling assembly onto the tank flange.
Figure 11A:
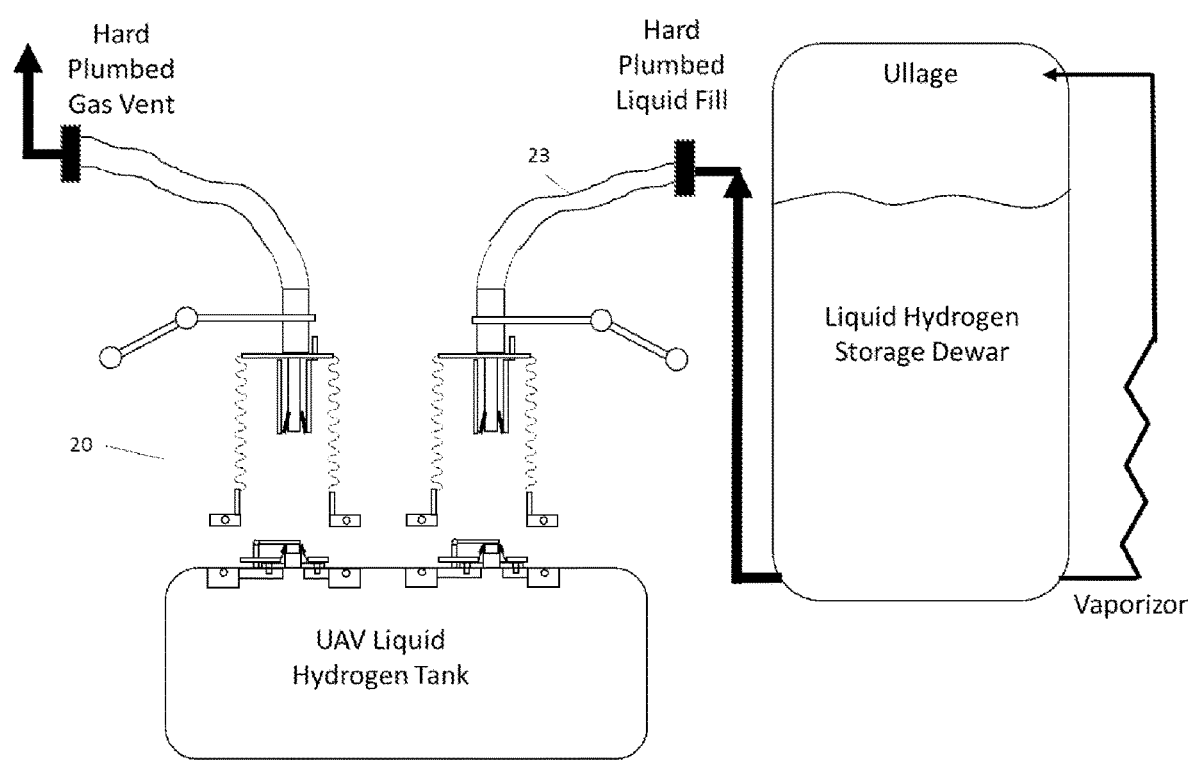
FIGS. 11A, 11B, 11C, and 11D (sometimes referred to collectively as FIG. 11) illustrate the four basic nozzle assembly positions that include disengage, engage, cap opening, and nozzle insertion using two nozzle assemblies; one for liquid fill and one for gas vent.
Figure 11B:
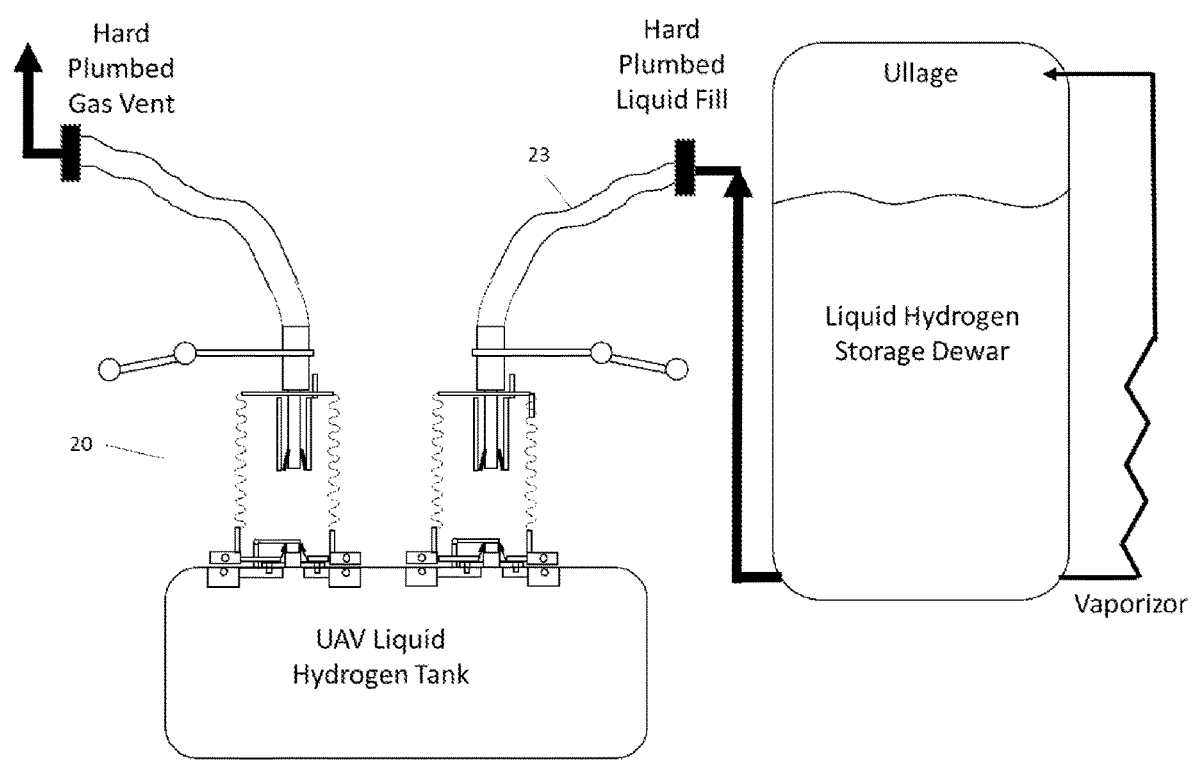
Figure 11C:
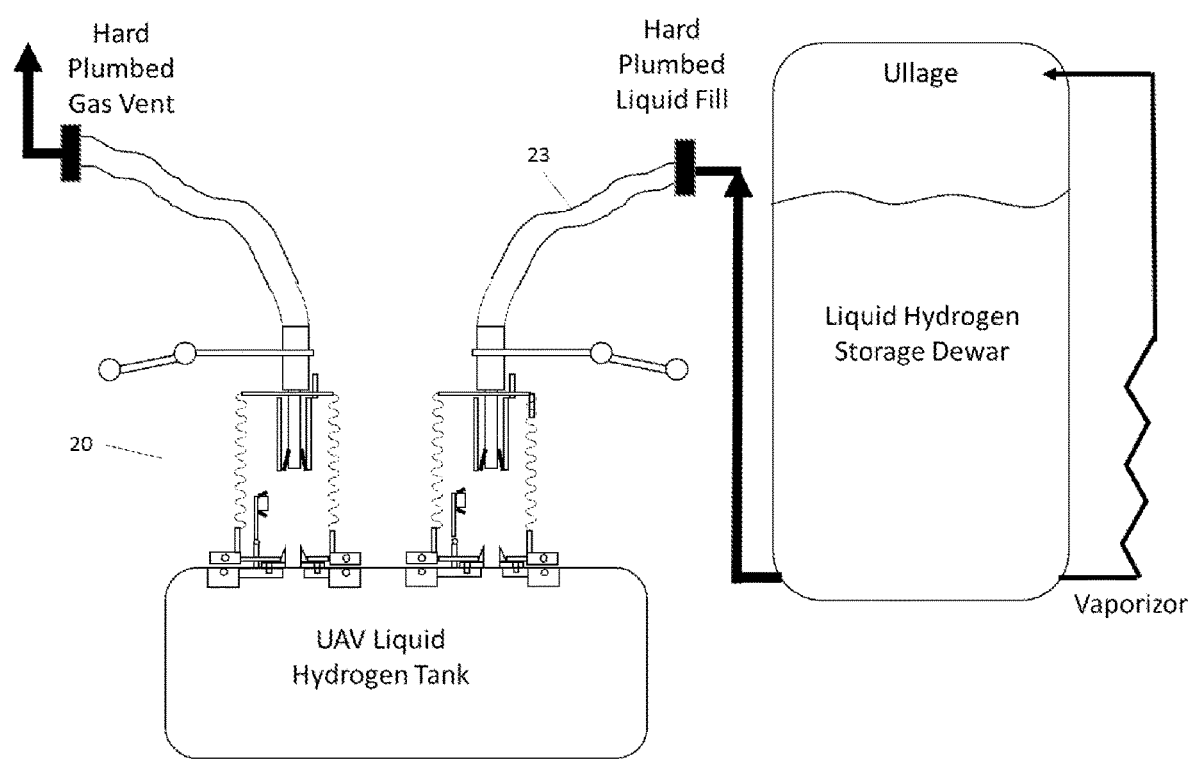
Figure 11D:
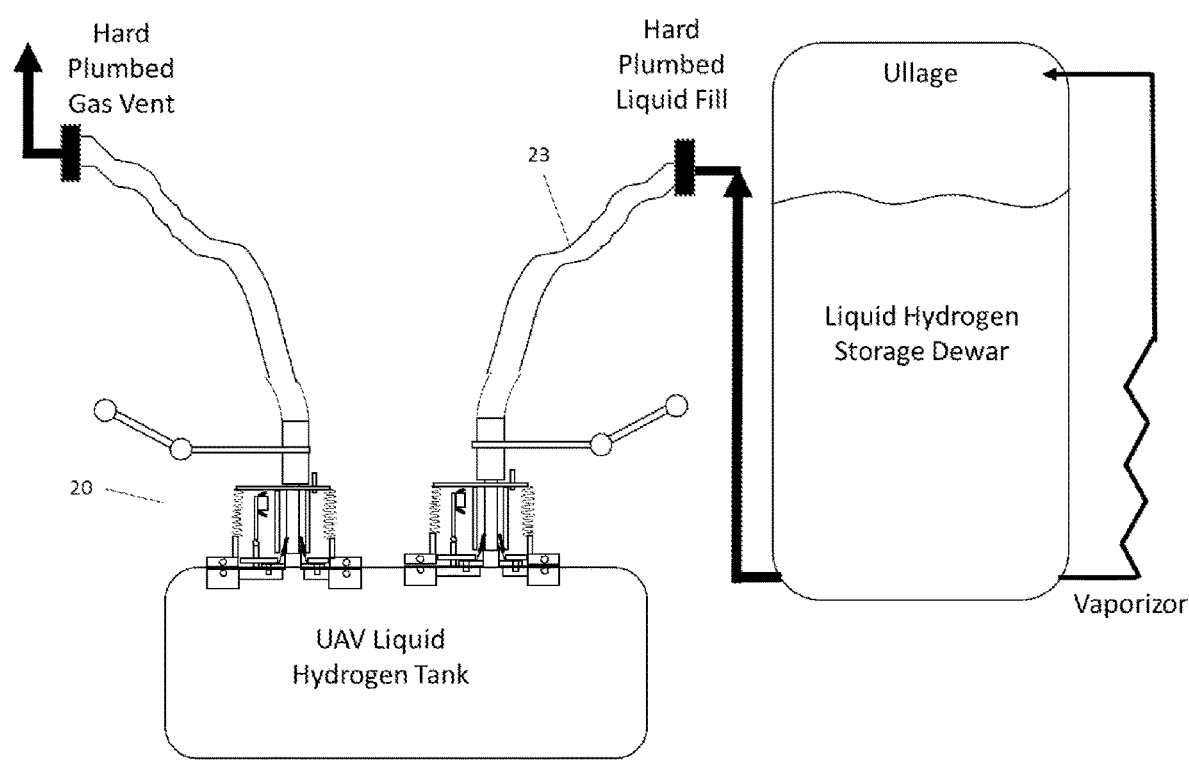
Figure 12A:
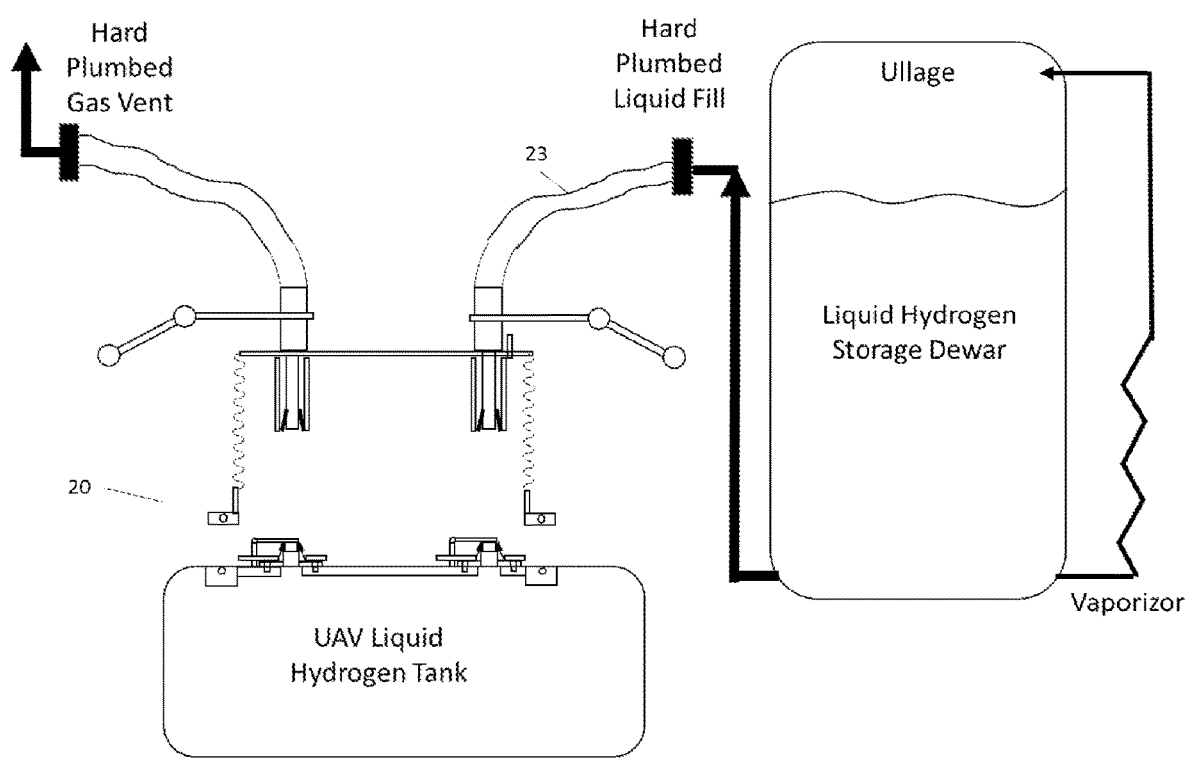
FIGS. 12A, 12B, 12C, and 12D (sometimes referred to collectively as FIG. 12) illustrate the four basic nozzle assembly positions that include disengage, engage, cap opening, and nozzle insertion using a single nozzle assembly with both a liquid fill and a gas vent within the assembly.
Figure 12B:
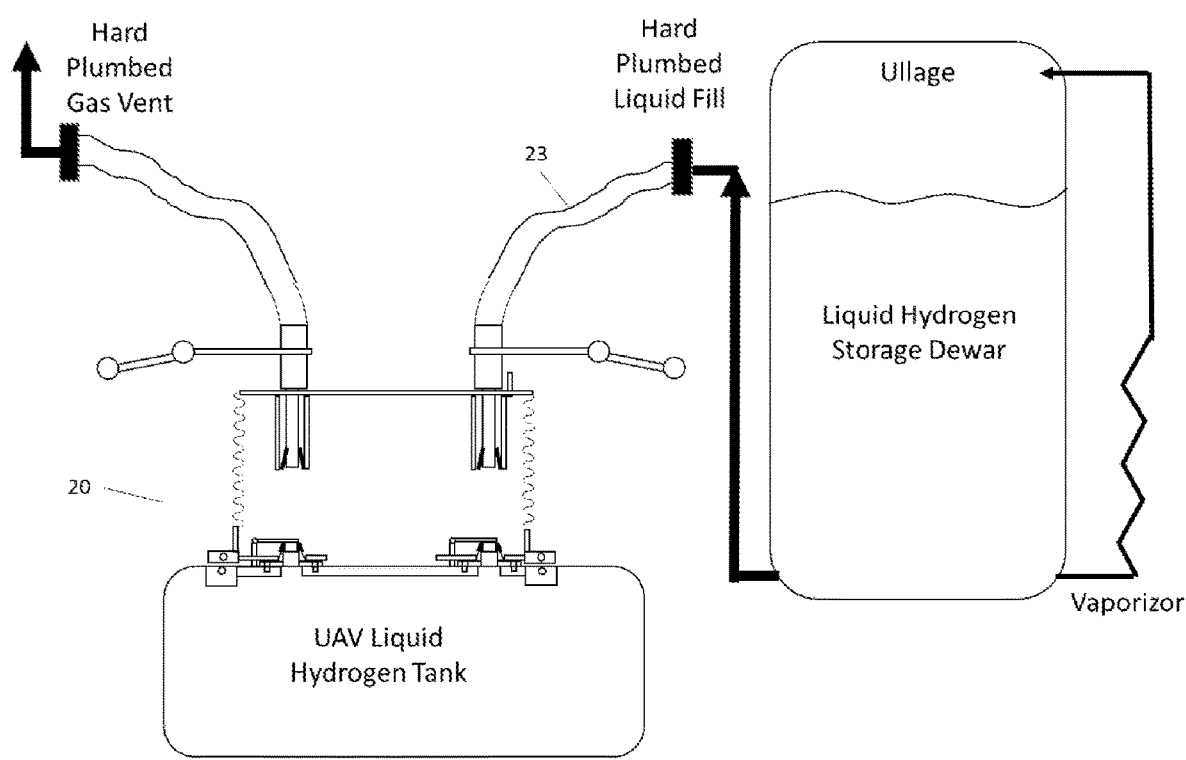
Figure 12C:
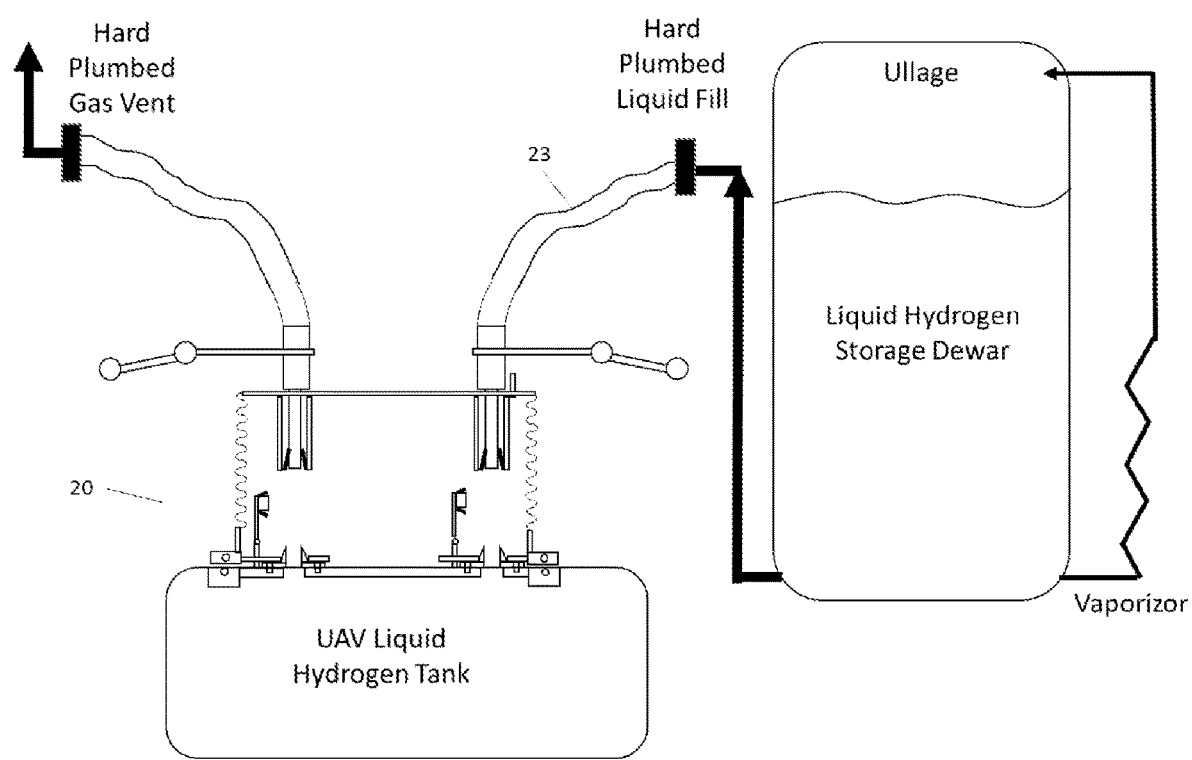
Figure 12D:
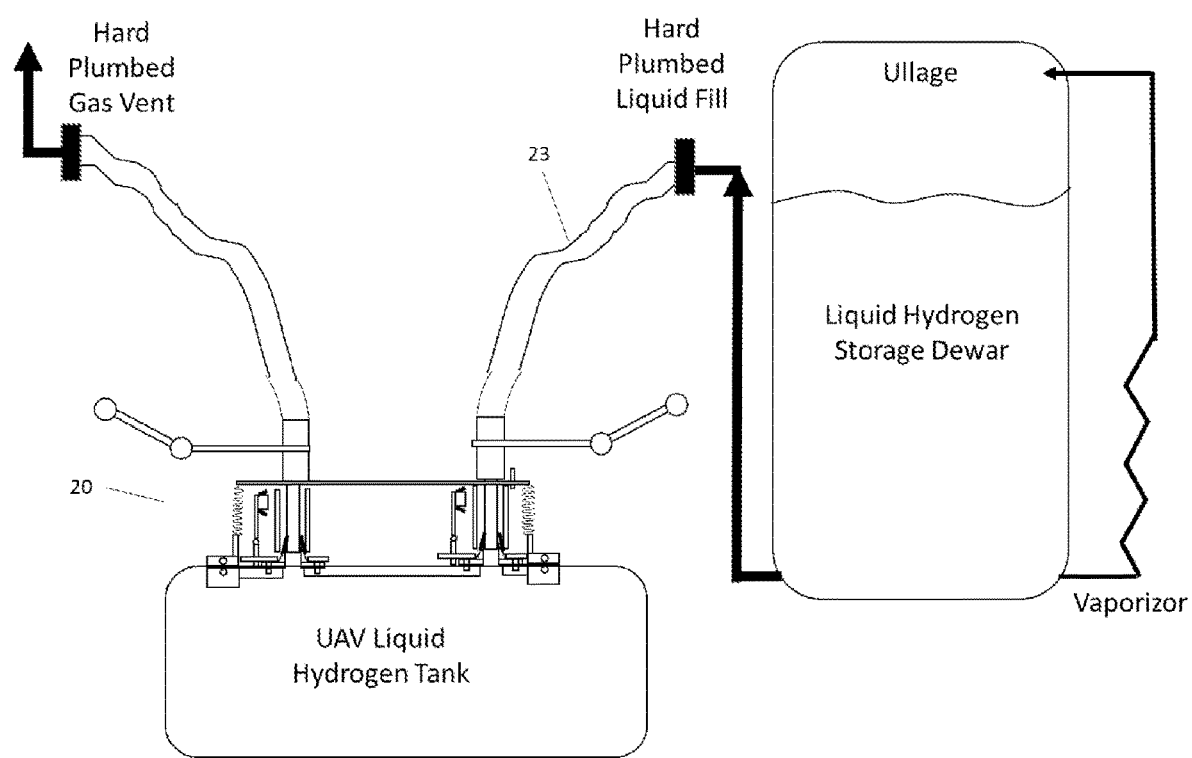
Figure 13A:
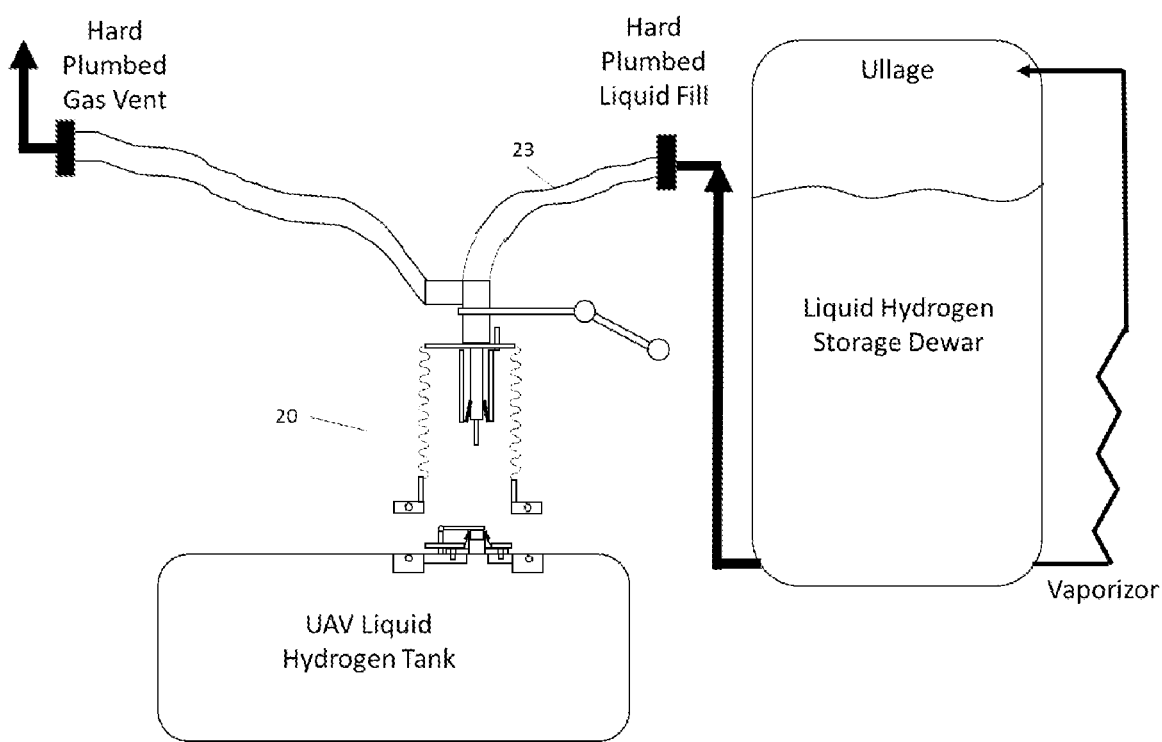
FIGS. 13A, 13B, 13C, and 13D (sometimes referred to collectively as FIG. 13) illustrate the four basic nozzle assembly positions that include disengage, engage, cap opening, and nozzle insertion using a single nozzle assembly with a concentric tube liquid fill and a gas vent within the assembly.
Figure 13B:
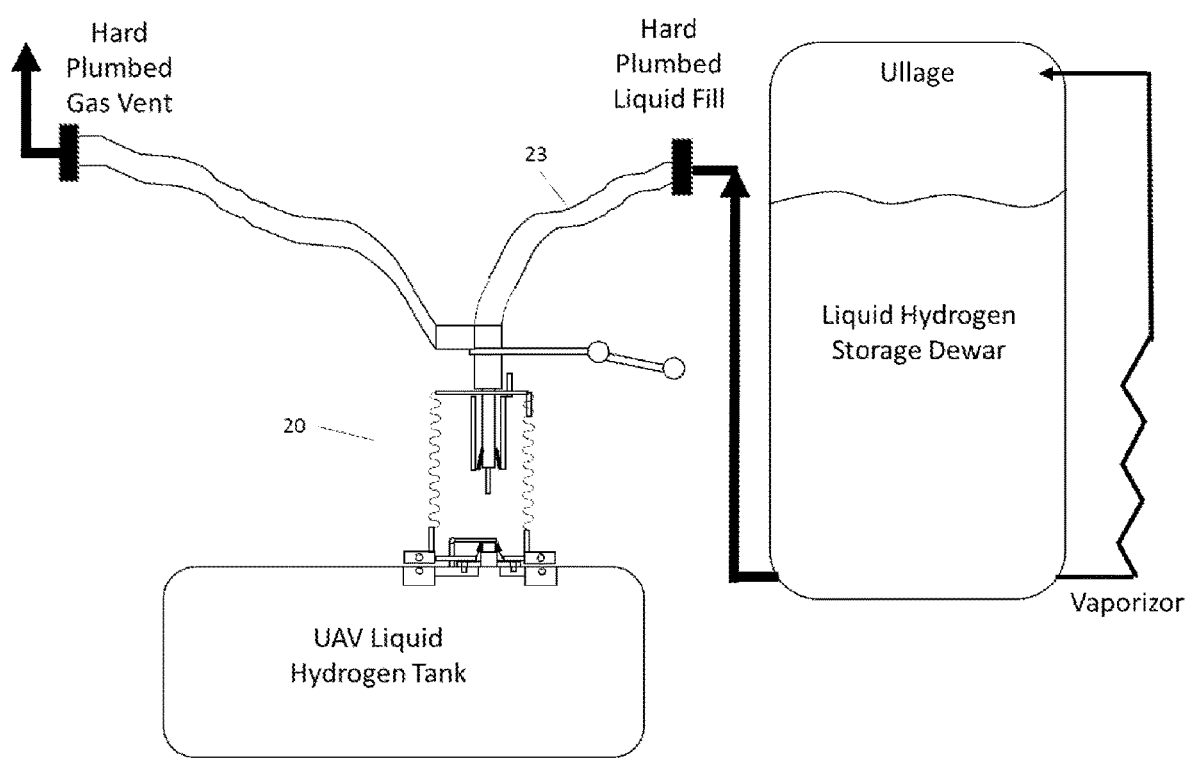
Figure 13C:
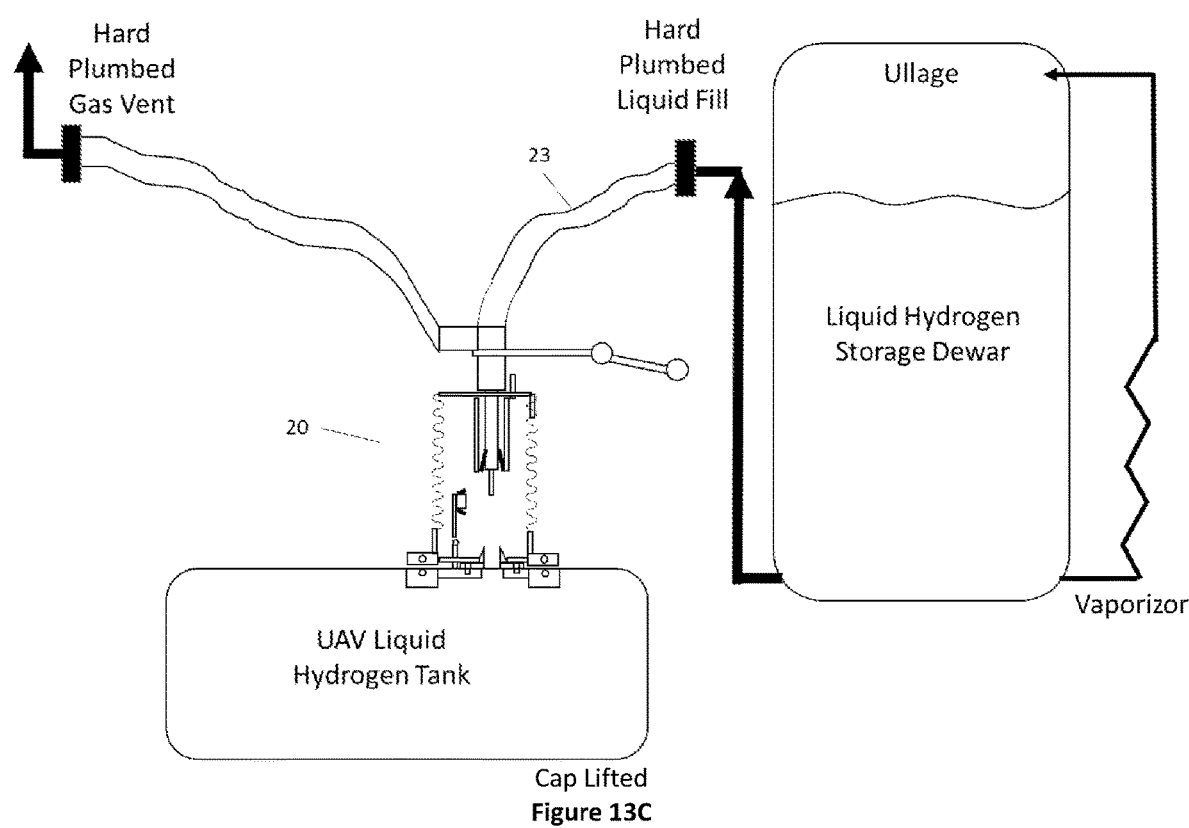
Figure 13D:
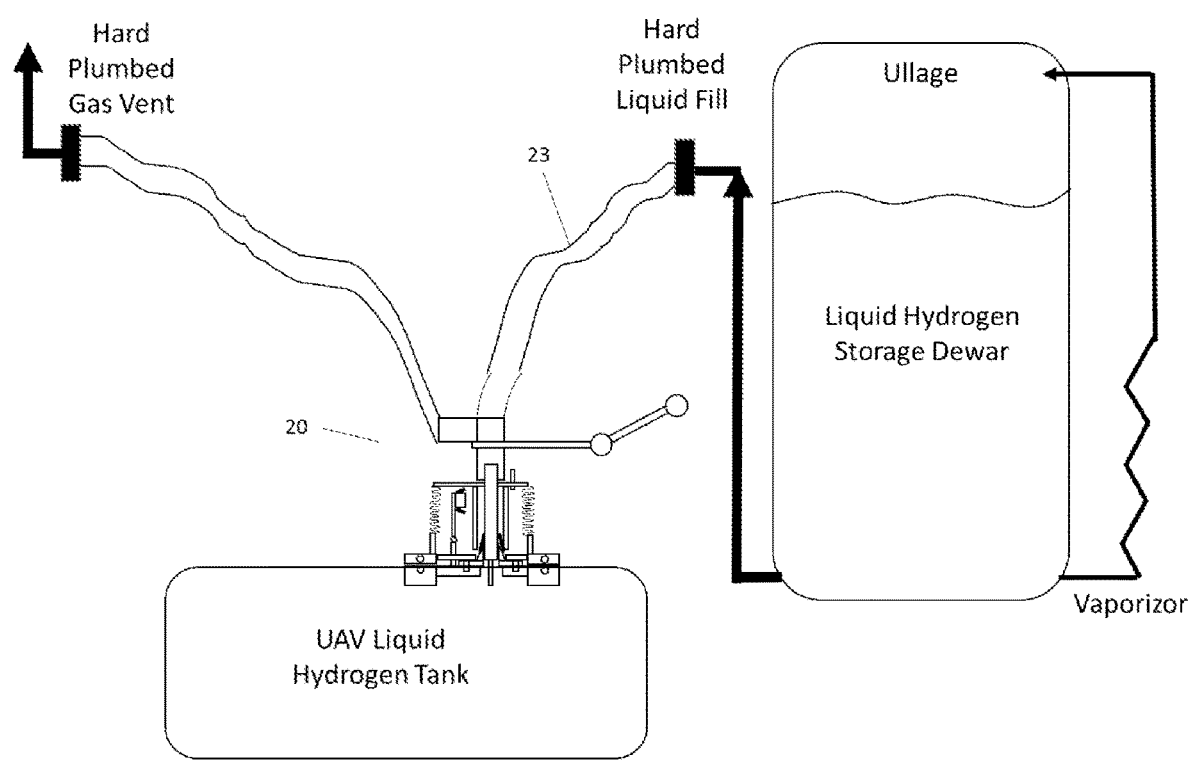

An alternative design to the coupling flange 11 and to the tank flange 13 is to provide a self-centering bevel in v-shaped groove. (See FIG. 10). Alternatives to permanent magnets as originally depicted include: Ring-shaped Halbach array of permanent magnets; permanent magnets in yoke; electromagnets in yoke (powered to engage), permanent magnets in yoke with opposing electromagnet (powered to release). Permutations include: magnets on the refueling assembly and iron (or nickel or other ferromagnetic material) on the tank (Nickel's crystal structure is FCC (face centered cubic) so it should not have a ductile-brittle transition); magnets on tank and iron on refueling assembly; or magnets on both.

An alternative design to the liquid hydrogen transfer tube nozzle 3 is to add a bevel to the end for easy insertion into the seal 15.

The bellows 1 used in the described invention maintains a vacuum jacket around the tube nozzle 3 when the refueling coupling assembly 20 is sealed against the tank flange 13. This application of a bellows differs than other uses of the bellows in that it is not permanently attached to both ends of the piping system. In addition, the bellows 1 is actively compressed and expanded when the robotic arm 24 is actuated to insert the tube nozzle 3.

FIG. 11 illustrates a sequence of events for the refueling of a UAV liquid hydrogen tank 38 using the innovative refueling coupling assembly 20. Once the UAV 50 is positioned directly under the refueling coupling assembly 20 the nozzles are disengaged as shown in FIG. 11A. In FIG. 11B the nozzle assembly 20 is brought in contact with the tank flange 13 using the robotic arm 24. Magnetic coupling of the two flanges 11, 13 is conducted using the electro magnets 12 buried inside the flanges 11, 13. The attractive force of the magnets puts pressure on the sealing surface gasket 54 between the two flanges 11, 13 to create a vacuum tight seal. The bellows 1 at this step are fully expanded. In FIG. 11C the cap 16 is opened, e.g., via a drive gear 36. The bellows 1 is still fully expanded. The final step shown FIG. 11D is the movement of the nozzle into the LH2 (liquid hydrogen) tank receptacle to seal on the tank flange seal 15. The tube nozzle 3 is forced down onto the sealing surface using the robotic arm 24. In FIG. 11 there are two separate nozzle coupling assemblies 20, one for the liquid fill and one for the vent. Each fluid is transferred through their respective flexible hoses, which attach to the refueling coupling assembly 20 and the flexible hose at one end.

FIG. 12 shows the same sequence as in FIG. 11 only that in this configuration only one vacuum space 22 is formed with the bellows 1. Inside the vacuum space 22 are two nozzles one for liquid and one for gaseous venting. There are two caps 16 that are both opened at the same time. There are two gear drives.

FIG. 13 shows the same sequence as in FIG. 11 only that in this configuration only one vacuum space 22 is formed with the bellows 1 and the nozzle includes a concentric tube configuration. One of the tubes is for the vent and one is for the liquid fill. Each flow path is separate but only one liquid hydrogen tank penetration is required along with only one cap 16.

Figure 14:
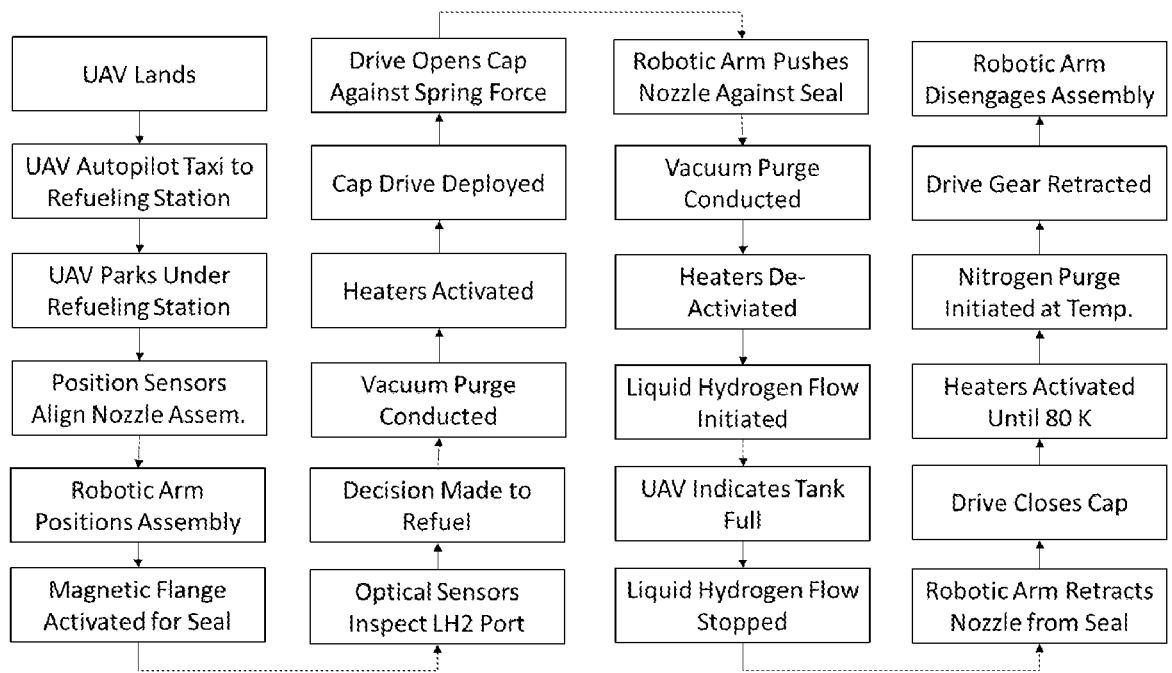
FIG. 14 is a flow diagram describing a method for the transfer of cryogenic fluids into and out of a cryogenic tank.

A method for transfer of liquid hydrogen using the described invention is presented in a flow diagram 100 in FIG. 14 and is described herein. The steps of flow diagram 100 are labeled as discussed below. The method applies to both on the ground refueling operations as well as in-flight refueling. For on the ground refueling, the UAV 50 will land near the refueling station and the autopilot will taxi the UAV 50 over to the refueling station where it will park underneath the refueling station. Position sensors 32 provide information on the relative location of the robotic arm 24 and the coupling flange 11 with respect to the UAV 50 fuel tank flange 13. The position sensor 32 will align the refueling coupling assembly 20 with the fuel tank flange 13. The magnets 10 in the flanges 11,13 will activate and attract the flanges to each other creating a seal. Optical sensors 60 within the assembly visually inspect the liquid hydrogen refueling tank flange 13 and cap 16. Once the decision has been made to refuel, e.g., by an appropriately programmed controller or processor, or is otherwise made, e.g., based on video data comparisons with a baseline configuration, the vacuum pump is activated and pumps down the vacuum space 22 to create a vacuum. Heating element 53 is activated to drive off moisture and other gases out of the chamber. The mechanical cap drive shaft 36 is translated into the vacuum space 22 where the gear on the drive and the gear on the spring hinge 7 are engaged. The mechanical drive is then rotated by an intrinsically safe motor 52 until a position sensor 32 indicates the cap is fully removed from the opening, exposing the tank flange seal 15. The heating element 53 is deactivated. The robotic arm 24 pushes the nozzle compression fitting 5 down into the tank flange seal 15. The vacuum purge is activated again and the pressure 28 is measured until it reaches the desired level. The liquid hydrogen fill valve, which is part of the storage dewar 46 is opened and liquid is pressure transferred into the UAV 50 fuel tank 38 until a sensor on-board the UAV 50 indicates full or alternatively a liquid/vapor sensor 70 inside the transfer tube nozzle 3 indicates full or another fill level. The tube nozzle 3 is then removed automatically by the robotic arm 24 until the bellows 1 displacement measurement 29 indicates it is back in its original position. The cap 16 is replaced by reversing the drive gear shaft 36. The drive gear shaft 36 is moved back into its starting position. The heating element 53 is turned on to warm up the internals of the vacuum space 22. A nitrogen purge is initiated once the temperature sensors 31 are above 90 Kelvin. Once temperatures are near ambient the magnets 10 in the flanges are released and the robotic arm 24 removes the refueling coupling assembly 20.

From the foregoing, it will be appreciated that specific embodiments of the invention have been described herein for purposes of illustration, but that various modifications may be made without deviating from the invention. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A refueling system for aircraft, comprising
a cryogenic fuel storage container mounted on a support platform,
the support platform positionable above a refueling station providing space for an aircraft beneath the support platform to permit positioning of the aircraft beneath the support platform for refueling with cryogenic fuel, and
a connection system comprising a refueling coupling assembly fluidly connectable to the cryogenic fuel storage container, the refueling coupling assembly including a nozzle vacuum jacketed through the use of expandable and contractible bellows and configured to move from a disengaged position in which the bellows are extended and the refueling coupling assembly is above a fuel tank inlet of the aircraft to an engaged position in which the bellows are contracted and the refueling coupling assembly engages the fuel tank inlet of the aircraft vertically to supply cryogenic fuel from the storage container to the aircraft located in the space.

2. The system of claim 1, further comprising a sensor system configured to align the fuel tank inlet of the aircraft with the connection system for supplying cryogenic fuel to the aircraft.

3. The system of claim 1, further comprising a cryogenic fuel generator on the support platform and a power source and control panel configured to control operation of (a) the cryogenic fuel generator to generate the cryogenic fuel and (b) the connection system for connection to the aircraft's fuel system.

4. The system of claim 1, further comprising an isolating system configured to provide an isolation space in which at least part of the connection system is located during the coupling of cryogenic fuel from the fuel storage container to the aircraft, the isolating system including the bellows.

5. The system of claim 4, further comprising a vacuum source configured to provide a controlled vacuum in the isolation space.

6. The system of claim 4, further comprising a species sensor configured to sense fuel in the isolation space.

7. The system of claim 1, the support platform is movable on wheels.

8. The system of claim 1, wherein the connection system includes a coupling system that comprises a cryogenic fuel transfer system with insulation to minimize thermal conduction, the nozzle, an isolation space, and a seal to connect with the fuel tank inlet of the aircraft.

9. The system of claim 8, further comprising
positioned on the support platform an electrolyzer configured to convert water to its constituent components hydrogen and oxygen, and
a refrigeration apparatus configured to refrigerate the hydrogen to cryogenic liquid hydrogen.

10. The system of claim 8, further comprising an alignment system including sensors to facilitate aligning the fuel tank inlet of the aircraft with the coupling system for transferring the cryogenic fuel to the aircraft.

* * * * *